US010972643B2

(12) United States Patent
Akkaya et al.

(10) Patent No.: US 10,972,643 B2
(45) Date of Patent: Apr. 6, 2021

(54) CAMERA COMPRISING AN INFRARED ILLUMINATOR AND A LIQUID CRYSTAL OPTICAL FILTER SWITCHABLE BETWEEN A REFLECTION STATE AND A TRANSMISSION STATE FOR INFRARED IMAGING AND SPECTRAL IMAGING, AND METHOD THEREOF

(71) Applicant: Microsoft Technology Licensing, LLC, Redmond, WA (US)

(72) Inventors: Onur Can Akkaya, Palo Alto, CA (US); Cyrus Soli Bamji, Fremont, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 109 days.

(21) Appl. No.: 16/002,862

(22) Filed: Jun. 7, 2018

(65) Prior Publication Data
US 2019/0306386 A1   Oct. 3, 2019

Related U.S. Application Data

(60) Provisional application No. 62/649,990, filed on Mar. 29, 2018.

(51) Int. Cl.
*H04N 5/225* (2006.01)
*H04N 5/33* (2006.01)
(Continued)

(52) U.S. Cl.
CPC ......... *H04N 5/2254* (2013.01); *G01S 17/894* (2020.01); *G02B 5/3025* (2013.01);
(Continued)

(58) Field of Classification Search
CPC ............. G02B 5/3025; G02F 1/133509; G02F 1/13363; G02F 1/1347; G02F 1/13473;
(Continued)

(56) References Cited

U.S. PATENT DOCUMENTS 5,619,355 A * 4/1997 Sharp .................. G02B 5/3016
349/116
5,936,739 A    8/1999 Cameron et al.
(Continued)

FOREIGN PATENT DOCUMENTS

EP    1058147    * 12/2000    ........... G02F 1/1334
EP    1058147 A2   12/2000
(Continued)

OTHER PUBLICATIONS

"Non Final Office Action Issued In U.S. Appl. No. 15/974,572", dated Sep. 18, 2019, 12 Pages.
(Continued)

*Primary Examiner* — Twyler L Haskins
*Assistant Examiner* — Akshay Trehan
(74) *Attorney, Agent, or Firm* — Alleman Hall Creasman & Tuttle LLP

(57) ABSTRACT

An optical filter for a camera is switchable between a reflection state and a transmission state. The optical filter includes a first plurality of liquid crystals configured to dynamically form cholesteric phase structures in the reflection state that block right-handed circularly polarized light in a spectral light sub-band and transmit light outside of the spectral light sub-band. The first plurality of liquid crystals dynamically forms a nematic phase arrangement in the transmission state that transmits light in the spectral light sub-band. The optical filter further includes a second plurality of liquid crystals configured to dynamically form cholesteric phase structures in the reflection state that block
(Continued)

left-handed circularly polarized light in the spectral light sub-band and transmit light outside of the spectral light sub-band. The second plurality of liquid crystals dynamically form a nematic phase arrangement in the transmission state that transmits light in the spectral light sub-band.

15 Claims, 8 Drawing Sheets

(51) Int. Cl.
*G02F 1/1347* (2006.01)
*G02F 1/1335* (2006.01)
*G02F 1/13363* (2006.01)
*G02B 5/30* (2006.01)
*G01S 17/894* (2020.01)
*G03B 11/00* (2021.01)
*G03B 9/00* (2021.01)

(52) U.S. Cl.
CPC ........ *G02F 1/1347* (2013.01); *G02F 1/13363* (2013.01); *G02F 1/13473* (2013.01); *G02F 1/133509* (2013.01); *G03B 9/00* (2013.01); *G03B 11/00* (2013.01); *H04N 5/33* (2013.01); *G02F 2203/01* (2013.01); *G02F 2203/02* (2013.01)

(58) Field of Classification Search
CPC . G02F 2203/01; G02F 2203/02; G03B 11/00; H04N 5/2254; H04N 5/33; G01S 17/89; G01S 17/894
See application file for complete search history.

(56) References Cited

U.S. PATENT DOCUMENTS

| | | |
|---|---|---|
| 6,403,947 B1 | 6/2002 | Hoyt et al. |
| 6,456,793 B1 | 9/2002 | Ray et al. |
| 6,633,354 B2 | 10/2003 | Li et al. |
| 7,164,117 B2 | 1/2007 | Breed et al. |
| 7,187,452 B2 | 3/2007 | Jupp et al. |
| 7,310,125 B2 | 12/2007 | Kim et al. |
| 7,342,658 B2 | 3/2008 | Kowarz et al. |
| 7,375,803 B1 | 5/2008 | Bamji |
| 7,420,656 B1 | 9/2008 | Sandusky et al. |
| 7,446,299 B2 | 11/2008 | Kobayashi |
| 7,652,736 B2 | 1/2010 | Padiyath et al. |
| 7,835,002 B2 | 11/2010 | Muhammed et al. |
| 7,994,465 B1 | 8/2011 | Bamji et al. |
| 8,109,634 B2 | 2/2012 | Gil |
| 8,780,113 B1 | 7/2014 | Ciurea et al. |
| 9,060,110 B2 | 6/2015 | Imai |
| 9,316,865 B2 | 4/2016 | Osterman et al. |
| 9,551,616 B2 | 1/2017 | McQuilkin et al. |
| 9,595,239 B2 | 3/2017 | Drolet et al. |
| 9,823,128 B2 | 11/2017 | Pau et al. |
| 10,180,385 B2 | 1/2019 | Fox et al. |
| 10,334,187 B2* | 6/2019 | Reed ............ H04N 5/2254 |
| 2002/0060784 A1 | 5/2002 | Pack et al. |
| 2002/0070349 A1 | 6/2002 | Hoyt |
| 2003/0132394 A1 | 7/2003 | Wolleschensky et al. |
| 2003/0171677 A1 | 9/2003 | Marmarelis |
| 2004/0135955 A1* | 7/2004 | Hong ................ G02F 1/13718 349/141 |
| 2004/0263732 A1* | 12/2004 | Jurg .................... G02F 1/13473 349/119 |
| 2005/0046584 A1 | 3/2005 | Breed |
| 2005/0099373 A1* | 5/2005 | Funfschilling ....... G02B 5/3016 345/87 |
| 2005/0192727 A1 | 9/2005 | Shostak et al. |
| 2005/0273218 A1 | 12/2005 | Breed et al. |
| 2006/0025897 A1 | 2/2006 | Shostak et al. |
| 2006/0180371 A1 | 8/2006 | Breed et al. |
| 2006/0208169 A1 | 9/2006 | Breed et al. |
| 2007/0158533 A1 | 7/2007 | Bamji et al. |
| 2008/0123097 A1 | 5/2008 | Muhammed et al. |
| 2008/0284575 A1 | 11/2008 | Breed |
| 2010/0091611 A1 | 4/2010 | Laake |
| 2010/0140461 A1 | 6/2010 | Sprigle et al. |
| 2011/0285980 A1 | 11/2011 | Newbury et al. |
| 2011/0294543 A1 | 12/2011 | Lapstun et al. |
| 2012/0019834 A1 | 1/2012 | Bornhop |
| 2012/0188347 A1* | 7/2012 | Mitchell ............ A61B 1/00193 348/50 |
| 2012/0287247 A1 | 11/2012 | Stenger et al. |
| 2012/0320157 A1 | 12/2012 | Junuzovic et al. |
| 2013/0038690 A1* | 2/2013 | Mitchell ................ G03B 35/04 348/46 |
| 2013/0101176 A1* | 4/2013 | Park ..................... G06T 7/50 382/106 |
| 2013/0188065 A1 | 7/2013 | Wegener |
| 2013/0215235 A1* | 8/2013 | Russell ................ G03B 35/00 348/47 |
| 2013/0218498 A1 | 8/2013 | Droit et al. |
| 2014/0078459 A1* | 3/2014 | Kim ..................... G02F 1/1333 349/193 |
| 2014/0092255 A1 | 4/2014 | Choiniere et al. |
| 2014/0098689 A1 | 4/2014 | Lee et al. |
| 2014/0145281 A1 | 5/2014 | Bever et al. |
| 2014/0152944 A1* | 6/2014 | Zhao ..................... G02F 1/1347 349/96 |
| 2014/0232912 A1* | 8/2014 | Morimoto ............. G03B 11/00 348/270 |
| 2014/0240692 A1 | 8/2014 | Tien et al. |
| 2014/0327837 A1* | 11/2014 | Osterman ................ H04N 9/04 349/2 |
| 2014/0378843 A1 | 12/2014 | Valdes et al. |
| 2015/0163474 A1* | 6/2015 | You ....................... G01S 7/4814 348/46 |
| 2015/0256767 A1* | 9/2015 | Schlechter ............ G01S 7/4816 348/46 |
| 2015/0304637 A1* | 10/2015 | Shin ...................... G01B 11/24 348/46 |
| 2016/0027313 A1 | 1/2016 | Loussides et al. |
| 2016/0033806 A1 | 2/2016 | Lavrentovich et al. |
| 2016/0086318 A1 | 3/2016 | Hannuksela et al. |
| 2016/0103015 A1 | 4/2016 | Ichihashi |
| 2016/0146595 A1 | 5/2016 | Boufounos et al. |
| 2016/0292626 A1 | 10/2016 | Green et al. |
| 2017/0059408 A1 | 3/2017 | Korner et al. |
| 2017/0059858 A1 | 3/2017 | Tilleman |
| 2017/0131096 A1 | 5/2017 | Karlov et al. |
| 2017/0140221 A1 | 5/2017 | Ollila et al. |
| 2017/0218686 A1* | 8/2017 | Galstian ............ G02F 1/133345 |
| 2017/0230551 A1 | 8/2017 | Akkaya et al. |
| 2017/0234985 A1 | 8/2017 | Kadambi et al. |
| 2017/0248811 A1* | 8/2017 | Clemen, Jr. ............ B64C 1/1484 |
| 2017/0332029 A1 | 11/2017 | Feick |
| 2018/0010936 A1 | 1/2018 | Simeonov et al. |
| 2018/0064399 A1 | 3/2018 | Buettgen et al. |
| 2018/0158533 A1 | 6/2018 | Zhou et al. |
| 2018/0270474 A1 | 9/2018 | Liu |
| 2018/0303574 A1 | 10/2018 | Ramirez luna et al. |
| 2018/0376067 A1 | 12/2018 | Martineau |
| 2019/0349536 A1 | 11/2019 | Ortiz egea et al. |
| 2019/0364254 A1 | 11/2019 | Ortiz Egea et al. |

FOREIGN PATENT DOCUMENTS

| | | |
|---|---|---|
| WO | 9510065 A1 | 4/1995 |
| WO | 2012057558 A2 | 5/2012 |
| WO | 2017149370 A1 | 9/2017 |

OTHER PUBLICATIONS

"STIC Search Results", Retrieved From: IP.Com, Retrieved on Sep. 18, 2019, 1 Page.
"Notice of Allowance Issued in U.S. Appl. No. 15/987,852", dated Jun. 27, 2019, 8 Pages.

(56) References Cited

OTHER PUBLICATIONS

"International Search Report and Written Opinion Issued in PCT Application No. PCT/US2019/023495", dated Jun. 17, 2019, 11 Pages.
"International Search Report and Written Opinion Issued in PCT Patent Application No. PCT/US19/030985", dated Jul. 30, 2019, 12 Pages.
Chang, "Hyperspectral Imaging: Techniques for Spectral Detection and Classification", Published in Springer Science & Business Media, Jul. 31, 2003.
Hans, et al., "Techniques and Applications of Hyperspectral Image Analysis", Published in John Wiley & Sons, Jan. 1, 2007.
Hansard, et al., "Time-of-Flight Cameras: Principles, Methods and Applications", Published in Springer Briefs in Computer Science, Dec. 7, 2012, 103 Pages.
Zanuttigh, et al., "Time-of-Flight and Structured Light Depth Cameras Technology and Applications", Published in Springer, Jan. 2016.
"Multispectral Optical Filter Assemblies", Retrieved From https://web.archive.org/web/20130912193244/https:/www.photonicsonline.com/doc/multispectral-optical-filter-assemblies-0001, Sep. 12, 2013, 1 Page.
Akkaya, Onur C.., "Camera with Optical Shutter over Sensor Array, Provisional Application as Filed in U.S. Appl. No. 62/649,990", filed Mar. 29, 2018, 18 Pages.
Kim, et al., "A 1.5Mpixel RGBZ CMOS Image Sensor for Simultaneous Color and Range Image Capture", In Proceedings of IEEE International Solid-State Circuits Conference Digest of Technical Papers, Feb. 19, 2012, pp. 391-393.
Lee, et al., "Electrically switchable visible to infra-red dual frequency cholesteric liquid crystal light shutter", In Journal of Materials Chemistry C, Mar. 19, 2018, 9 Pages.
Mathies, Daven, "Panasonic's new organic sensor can switch between visible and NIR sensitivity", Retrieved from: https://www.digitaltrends.com/photography/panasonic-organic-visible-nir-sensor/, Feb. 10, 2017, 6 Pages.
Xiang, et al., "Electrically Tunable Selective Reflection of Light from Ultraviolet to Visible and Infrared by Heliconical Cholesterics", In Journal of Advanced Materials, vol. 27, Issue 19, Mar. 27, 2015, pp. 3014-3018.
"Final Office Action Issued in U.S. Appl. No. 15/974,572", dated Mar. 13, 2020, 12 Pages.
Callenberg, et al., "Snapshot Difference Imaging using Time-of-Flight Sensors", In repository of arxiv; arXiv:1705.07108, May 19, 2017, 10 Pages.
"Non Final Office Action Issued in U.S. Appl. No. 15/974,572", dated Jul. 16, 2020, 11 Pages.
"Notice of Allowance Issued in U.S. Appl. No. 15/974,572", dated Oct. 30, 2020, 8 Pages.

\* cited by examiner

CAMERA COMPRISING AN INFRARED ILLUMINATOR AND A LIQUID CRYSTAL OPTICAL FILTER SWITCHABLE BETWEEN A REFLECTION STATE AND A TRANSMISSION STATE FOR INFRARED IMAGING AND SPECTRAL IMAGING, AND METHOD THEREOF

CROSS REFERENCE TO RELATED APPLICATIONS

This application claims priority to U.S. Provisional Patent Application Ser. No. 62/649,990, filed Mar. 29, 2018, the entirety of which is hereby incorporated herein by reference for all purposes.

DETAILED DESCRIPTION

Figure 1:
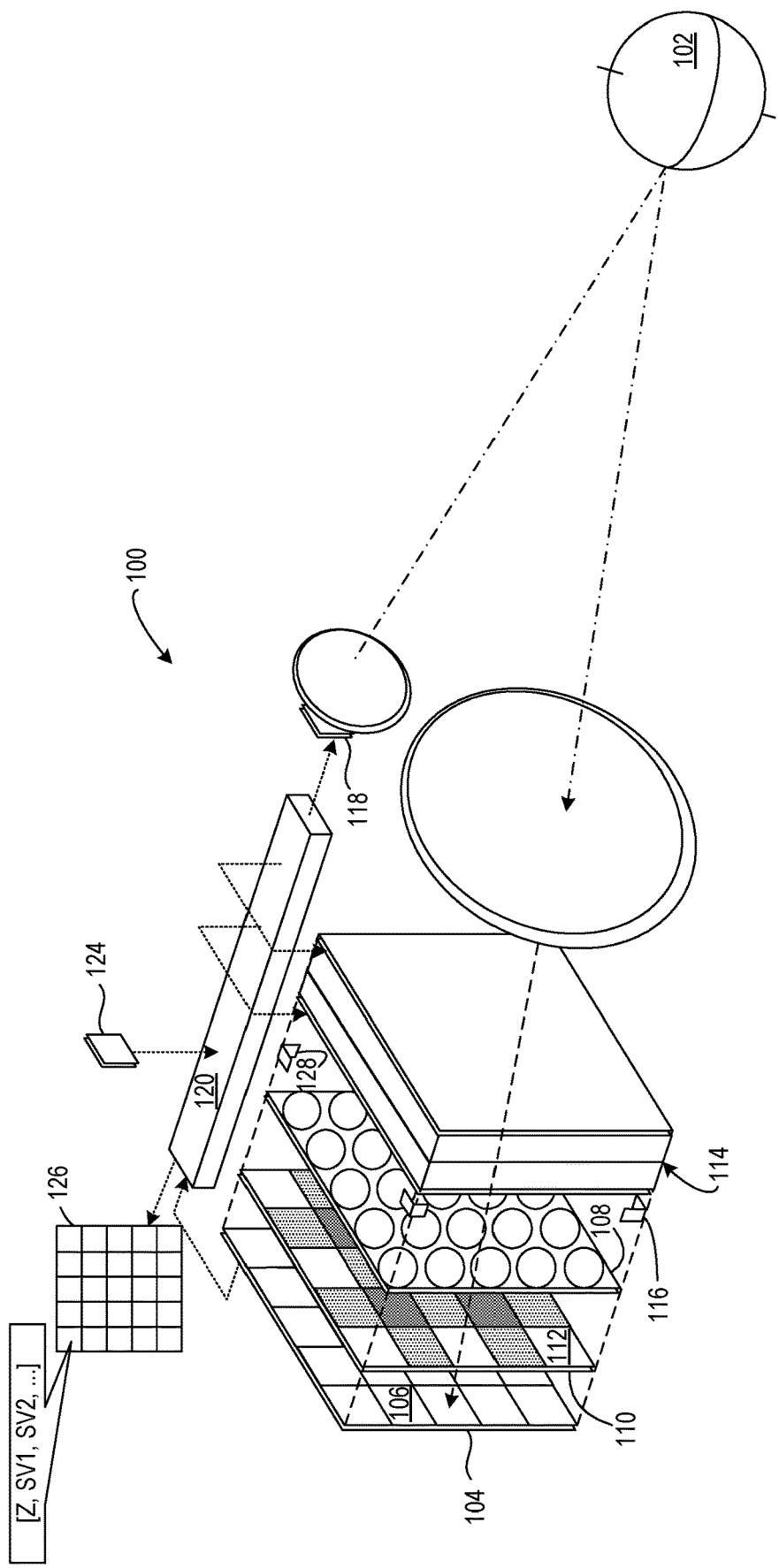
FIG. 1 is an exploded, schematic view showing aspects of an example camera.

Attempts to acquire different types of images (e.g., visible, depth) using the same sensor array may be complicated by the different wavelength sub-bands used by the respective imaging processes. Visible imaging typically uses wideband visible light as the illumination source and depth imaging typically uses narrow-band infrared (IR) light. In this disclosure, the term 'infrared' (IR) light includes so called near-infrared (NIR) wavelengths of about 850 nanometers (nm). Depth measurements may be taken using IR light, including NIR light, or any other suitable wavelength. In some examples, visible imaging will also be referring to as "flat" to differentiate from the complementary functionality of obtaining Z/depth values for pixels.

In one approach, a specialized array of filter elements is arranged in registry with the sensor elements of the sensor array. The filter array includes a repeated side-by-side tiling of filter elements having visible-transmissive, IR-blocking elements as well as IR-transmissive, visible-blocking elements. A disadvantage of this approach, referred to at times as a "non-converged sensor," is that both visible light and IR images are acquired on less than the full area of the sensor array, which decreases both the resolution and the signal-to-noise ratio for both images.

Accordingly, this disclosure is directed to an optical filter for a camera that is electronically switchable between a reflection state and a transmission state. In the reflection state, the optical filter is configured to block light in a spectral light sub-band (e.g., visible light sub-band) and transmit light outside of the spectral light sub-band (e.g., IR light sub-band). In the transmission state, the optical filter is configured to transmit light inside and outside of the spectral light sub-band. The optical filter is configured to operate in a manner that is polarization insensitive. In particular, the optical filter includes liquid crystals that are configured to block right-hand circularly polarized light (RHCP) in the spectral light sub-band when the optical filter is in the reflection state. The optical filter further includes liquid crystals that are configured to block left-hand circularly polarized light (LHCP) in the spectral light sub-band when the optical filter is in the reflection state. The net result is that, when the two types of liquid crystals are manipulated to be in a transmissive state, light passes through regardless of its polarization state.

Such a configuration enables the optical filter to be polarization insensitive. Moreover, the optical filter may be incorporated into a camera to facilitate acquisition of images in spectral light and IR sub-bands with high signal-to-noise ratio. Such an optical filter may enable the entire sensor array to be used to acquire the IR image, while causing interfering visible wavelengths to be rejected. During monochrome or color-image acquisition, the entire sensor array is made responsive to visible light.

In this disclosure, the term 'spectral' light applies generally to the portion of the electromagnetic spectrum ranging from the ultraviolet to near IR, and thus includes visible light. The term 'visible' is applied to the portion of the electromagnetic spectrum from about 400 to about 700 nanometers.

FIG. 1 shows aspects of an example camera 100. The term 'camera' refers herein to any imaging component having at least one optical aperture and sensor array configured to image a scene or subject 102. Camera 100 includes a sensor array 104 of individually addressable sensor elements 106. In some implementations, the sensor elements may be complementary metal-oxide semiconductor (CMOS) elements, but other suitable architectures are envisioned as alternatives. Each sensor element is responsive to light over a broad wavelength band. For silicon-based sensor elements, the wavelength response may range from 300 to 1100 nm, for example. Sensor array 104 is schematically illustrated with only twenty-five sensors 106 for simplicity, although there is no theoretical limitation to the number of sensors 106.

In some implementations, the sensors 106 of sensor array 104 may be differential sensors. Each differential sensor may include different regions that are energized according to two different clock signals. In one example, to measure modulated active illumination, the two clock signals may be substantially complementary (e.g., the two clock signals have 50% duty cycles that are 180 degrees out of phase). In other examples, the two clock signals may have a different relationship, such as for measuring ambient illumination or non-modulated active illumination. When the different regions are activated based on the corresponding clock signal, electric fields are created that attract and collect photoelectric charges in the different regions. The different regions may be separated by shallow trench isolation (STI) features that create a barrier that ensures charges collected in one region do not transfer to an adjacent region even if one is at a higher potential. It will be appreciated that any suitable technique may be employed to isolate the different regions of the pixel.

Such operation and materials of the sensor array allows for the same sensor array to be used to measure active light across a broad spectrum (e.g., ~400-1100 nm) including ultraviolet, visible, NIR, and IR light. For example, Silicon may be used as the active material in the sensor array to enable measurement of light in such a broad spectrum. Further, the differential sensors may reduce system noise because only one read operation is required to perform a differential measurement of active spectral light and ambient light. In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory. Differential pixel operation described above has other advantages such as reduced common mode effects (ambient light, dark current, etc.)

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be used.

Microlens array 108 optionally may be arranged directly over sensor array 104. Microlens array 108 includes a plurality of microlens elements. Each microlens element of microlens array 108 may be registered to a differential sensor 106 of the sensor array 104. When included, microlens array 108 may provide a larger effective fill factor at each of the sensors, for increased collection efficiency and reduced cross-talk between pixels.

Configured for visible as well as IR imaging, camera 100 optionally may include a color filter array (CFA) 110 of color filter elements 112. When included, the color filter elements are arranged in registry with sensor elements 106 of sensor array 104. An example CFA may present a Bayer pattern—i.e., a repeated tiling of 2×2 subarrays having two green-transmissive elements, one blue-transmissive element, and one red-transmissive element in each subarray, for example. In this implementation, the integrated response from sensor array 104 may be converted into a full-color image using a de-mosaicing algorithm. In implementations in which both visible and IR response is required at each sensor element, all of the color filter elements may be highly transmissive in the IR band of interest. Being transmissive to both visible and IR light, however, CFA 110 will not exclude visible light as a noise source in IR imaging. Nor will it exclude IR light as a noise source in visible imaging. For this purpose, in implementations in which both visible and IR imaging are provided, an electronically switchable optical filter 114 is included. Note that in this implementation the RGB image is not utilizing each pixel for each visible color. Instead, the RGB image may be constructed using a de-mosaicing process.

Optical filter 114 may be arranged over sensor array 104, so as to optically cover the sensor array. Optical filter 114 is electronically switchable between a reflection state and a transmission state. In the reflection state, optical filter 114 is configured to block spectral light in a spectral light sub-band (e.g., visible light sub-band) and transmit light outside the spectral light sub-band (e.g., NIR or IR sub-bands). Blocked spectral light may be absorbed, reflected, and/or scattered by optical filter 114, depending on the implementation. In the transmission state, optical filter 114 is configured to transmit light both inside and outside the spectral light sub-band. In some implementations, optical filter 114 may be broadly transmissive in the transmission state—i.e., transmitting all of the wavelengths blocked and transmitted in the reflection state.

Optical filter 114 includes one or more layers of liquid crystals (LC) that are used to selectively block spectral light in the spectral light sub-band. In particular, optical filter 114 utilizes a cholesteric phase of the liquid crystals to create different Bragg reflections that can be electrically switched on and off. Note that the Bragg reflections created by the different liquid crystal layers, in some cases, may have some spectral light leakage (e.g., 5%), such that not all spectral light in the spectral light sub-band is blocked when optical filter is in the reflection state. In other words, optical filter 114 may be configured to block at least some, and preferably substantially all, spectral light in the spectral light sub-band when the optical filter is in the reflection state.

Optical filter 114 may be configured to be polarization insensitive. In other words, optical filter 114 is configured to, in the reflection state, block light in the spectral light sub-band regardless of a polarization of the light incident on the optical filter. Likewise, optical filter 114 is configured to, in the transmission state, allow transmission of light inside and outside of the spectral light sub-band regardless of a polarization of the light incident on the optical filter. To enable such polarization insensitivity, optical filter 114 may include one or more matched pairs of LC layers that collectively block right-handed circularly polarized (RHCP) light and left-handed circularly polarized (LHCP) light.

FIGS. 2A-2D schematically show aspects of a matched pair of LC layers of optical filter 114 of FIG. 1. Optical filter 114 includes example liquid crystal (LC) layers 200 and 202. LC layers 200 and 202 may be representative of one of a plurality of matched pairs of LC layers of the optical filter. LC layers 200, 202 may be individually switchable between the reflection state and the transmission state by applying a voltage across the LC layers 200, 202 via electrodes 208, 210. LC layers 200, 202 may be configured to, in the reflection state, block spectral light in the same spectral light sub-band and transmit spectral light outside of the spectral light sub-band. Further, LC layers 200, 202 may be configured to, in the transmission state, transmit spectral light in the spectral light sub-band along with spectral light outside the spectral light sub-band.

The LC layer 200 includes a first plurality of liquid crystals 204 and the LC layer 202 includes a second plurality of liquid crystals 206. The first and second pluralities of liquid crystals 204, 206 are configured to dynamically form cholesteric phase structures that block light in a spectral light sub-band and transmit light outside of the spectral light sub-band in the reflection state. Furthermore, the first and second pluralities of liquid crystals 204, 206 are each configured to dynamically form a nematic phase arrangement that transmits light in the spectral light sub-band along with light outside the spectral light sub-band in the transmission state.

The first plurality of liquid crystals 204 may be differently configured than the second plurality of liquid crystals 206 such that each of the differently-configured plurality of liquid crystals selectively reflect differently-polarized light. In particular, the first plurality of liquid crystals 204 may be configured to reflect right-handed circularly polarized light in the reflection state and the second plurality of liquid crystals 206 may be configured to reflect left-handed circularly polarized light in the reflection state. The differently configured first and second pluralities of liquid crystals 204, 206 may cooperate to make the optical filter 114 polarization-insensitive.

Figure 2A:
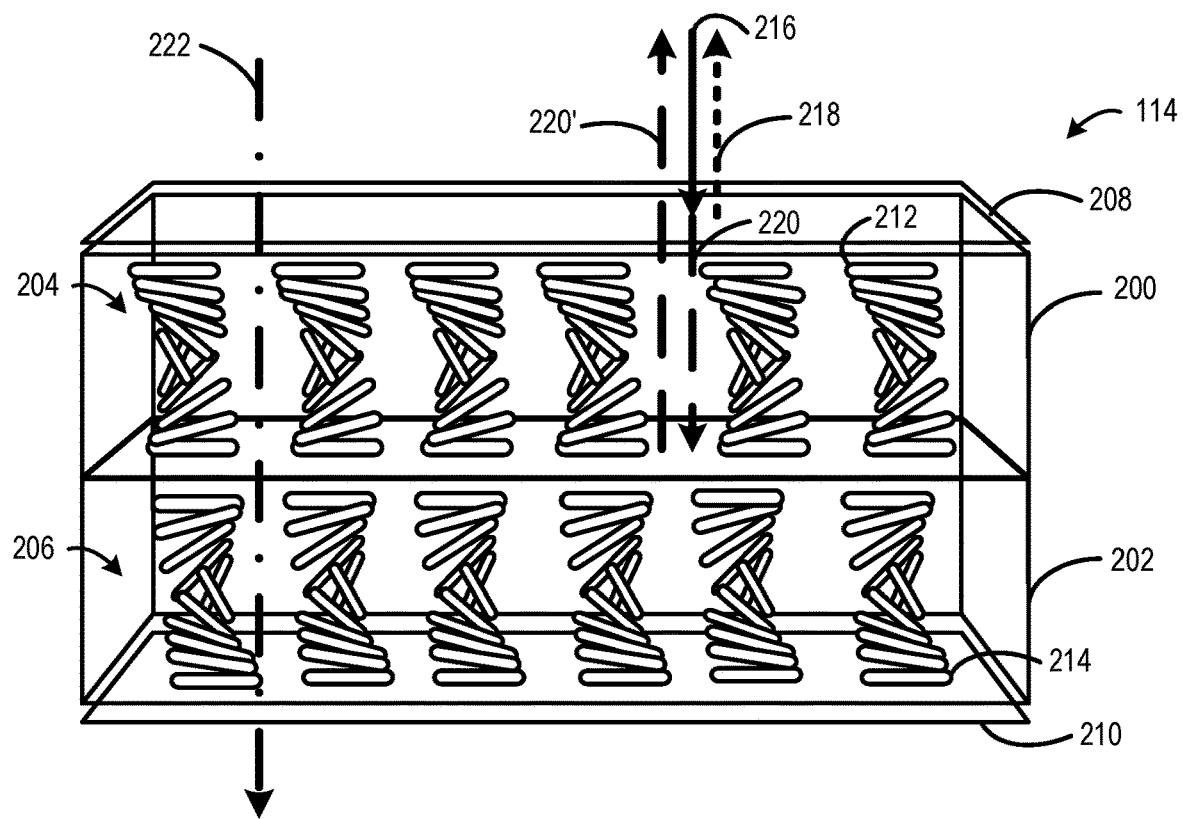
FIG. 2A schematically shows aspects of an optical filter switched to a reflection state.

In FIG. 2A, an activation voltage is not applied to electrodes 208, 210 such that the LC layers 200, 202 are in the reflection state. In the reflection state, the liquid crystals 204 and 206 are in a cholesteric liquid crystal (CLC) phase. In the CLC phase, the liquid crystals 204, 206 rotate about an axis parallel to an optical axis of the camera to form helical structures. In the illustrated example, the liquid crystals 204 in the LC layer 200 form helical structures 212 having right-handed rotation about the rotational axis. In other words, the helical structures 212 are twisted counter-clockwise. Further, the liquid crystals 206 in the LC layer 202 form helical structures 214 having left-handed rotation about the rotational axis. In other words, the helical structures 214 are twisted clockwise.

Figure 2B:
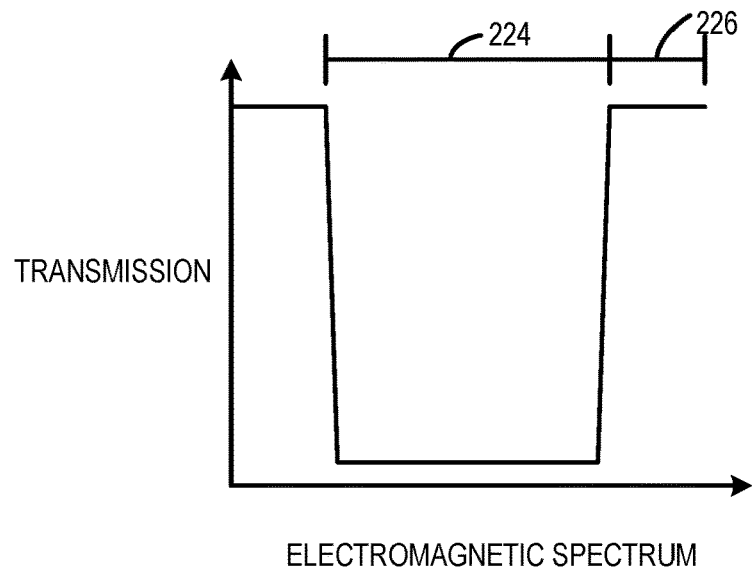
FIG. 2B is a graph showing example spectral light transmission when an optical filter is in a reflection state.

When unpolarized spectral light 216 in a spectral light sub-band that is blockable by the LC layers 200, 202 is incident on the LC layer 200, right-handed circularly polarized (RHCP) light 218 that matches the handedness of the helical structures 212 in the LC layer 200 is reflected back by the helical structures 212. The remaining left hand circular polarized (LHCP) light 220 is transmitted through the LC layer 200 with minimal change (e.g., except small losses due to absorption in the conductors, reflections from interfaces or scattering in the liquid crystals). When the LHCP light 220 is incident on the LC layer 202, the left-handed helical structures 214 reflect the LHCP light 220'. This reflected LHCP light 220' is transmitted back through the LC layer 200 in the return path. Accordingly, as shown in FIG. 2B, all the unpolarized spectral light (e.g., 216 of FIG. 2A) within a spectral light sub-band 224 of the CLC phase is substantially reflected by the LC layers 200, 202 of the optical filter 114. Furthermore, in the reflection state, IR light (e.g., 222 of FIG. 2A) in the IR light sub-band 226 is transmitted with high efficiency independent of its polarization through the LC layers 200, 202 of the optical filter 114. Accordingly, when the optical filter is in the reflection state, the optical filter 114 can be used for IR/depth imaging without interference from impinging spectral light outside of the IR light sub-band (e.g. visible light). In other implementations, the LC layers may be configured to block IR light when the LC layers are in the reflection state.

Note that the first and second pluralities of liquid crystals 204, 206 are not embedded with liquid crystal nanopores. Rather, the helical structures 212, 214 dynamically formed by the liquid crystals in the CLC phase are the primary structures that block incident light in the spectral light sub-band 224.

In one example, the LC director may follow a trajectory to form the helical structures as described by nx=cos(qz), ny=sin(qz), nz=0, where q is the rate of molecular rotation ($q=2\pi/P_0$), and $P_0$ is the pitch distance over which the LC director completes a full cycle of rotation ($2\pi$). Such CLC phase helical structures 212, 214 provide a wavelength-selective reflection whose spectral characteristics depend on $P_0$, birefringence of the LC ($\Delta n = ne-no$), the wavelength, and the angle of incidence. The CLC phase provides a wavelength-selective Bragg reflection, which occurs at a center wavelength of $\lambda_0=nP_0 \cos \theta$, where $n^2=(ne^2+2no^2)/3$, ne and no are the extraordinary and ordinary refractive indexes of the LC, respectively, and $\theta$ is the angle of propagation inside the LC. The first and second pluralities of liquid crystals 204, 206 of optical filter 114 may be configured to have any suitable birefringence. In some implementations, optical filter 114 may be configured to block light across a wide band (e.g., ~400-1100 nm) of the electromagnetic spectrum when optical filter 114 is in the reflection state. In one example, in order to increase the bandwidth of the spectral light sub-band that is blocked by optical filter 114 when optical filter is in the reflection state, the first and second pluralities of liquid crystals have 204, 206 may have a high birefringence. For example, the first and second pluralities of liquid crystals have a birefringence greater than 0.5. In one example, such liquid crystals may have a birefringence around 0.6-0.8. Note that high birefringence liquid crystals may be employed in some implementations where the helical structures have a uniform pitch. In other implementations where the helical structures have a gradient pitch, liquid crystals having a lower birefringence may be employed, such as liquid crystals having a birefringence lower than 0.4. In other words, the gradient pitch among the helical structures may allow for a lower birefringence of the liquid crystals. In one example, a stack of narrow-band LC layers that are collectively configured to block light over a wide band may have a birefringence around 0.2-0.25. Such a stacked narrow-band LC layer configuration may provide the benefit of having a faster response time of switching between the reflection and transmission states relative to a configuration that includes liquid crystals that have a higher birefringence. Also, liquid crystals having a higher birefringence may be more stable in response to ultraviolet light relative to liquid crystals having a lower birefringence. Furthermore, the bandwidth of the Bragg reflection can be calculated by $\Delta\lambda=\Delta n P_0$. In some implementations, in order to increase the bandwidth of the spectral light sub-band, the first and second pluralities of liquid crystals have 204, 206 may have different pitch distances ($P_0$) over which the liquid crystals rotate to dynamically form the cholesteric phase structures 212, 214. In other words, the helical structures within the same LC layer may have a gradient pitch. Optical filter 114 may be configured to reflect any suitable range of light in any suitable spectral light sub-band.

Note that the depicted boundaries of the spectral light sub-band 224 are idealized. In practice, the boundaries/transitions between spectrum in which light is reflected relative to light that is transmitted may be shaped based on the number of periods of the helical structures 212, 214 formed in the LC layers 200, 202. For example, as the number of periods of the helical structures increase the transitions in the reflection spectrum get sharper, which might potentially lead to less leakage of light in the spectra light sub-band 224. On the other hand, a smaller number of periods leads to a thinner device which might be advantageous in terms of response time and driving voltage requirements. As such, optical filter 114 may balance form factor with leakage according to the requirements of the particular implementation. Furthermore, oblique incidence can lead to a blue-shift in the reflection spectrum, so in designing optical filter 114 for a specific application, the angular range of the input light may be considered in determining the functional wavelength range of the spectral light sub-band that is blocked when optical filter is in the reflection state.

Figure 2C:
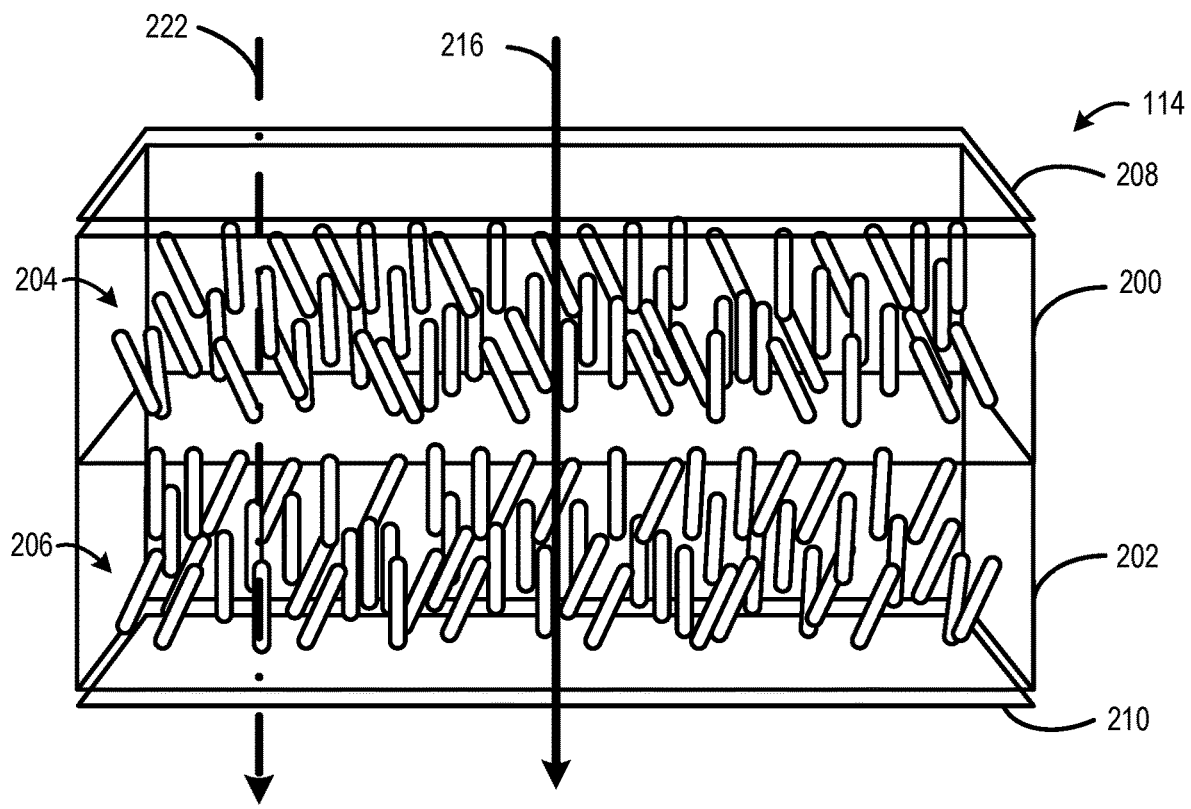
FIG. 2C schematically shows aspects of an optical filter switched to a transmission state.
Figure 2D:
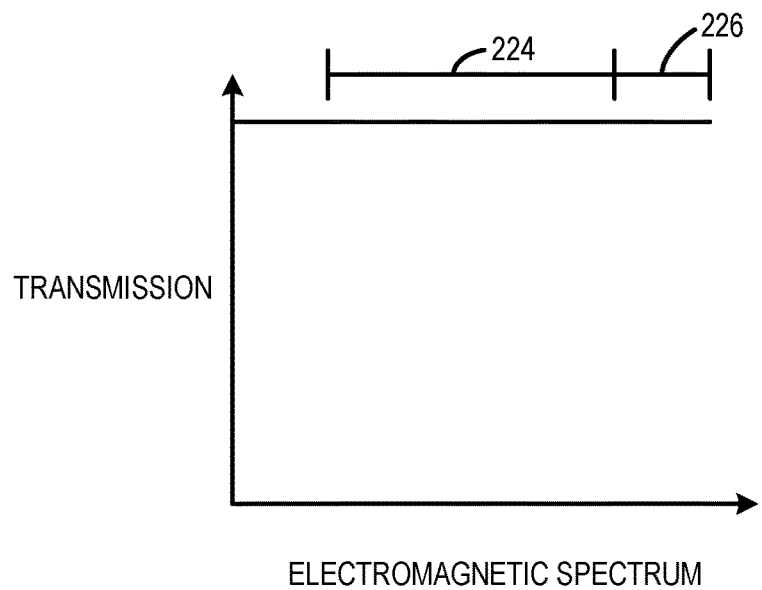
FIG. 2D is a graph showing example spectral light transmission when an optical filter is in a transmission state.

In FIG. 2C, an activation voltage is applied to each of the transparent conductors 208, 210 that generates an electric field across the LC layers 200, 202 to switch the LC layers 200, 202 to the transmission state. In particular, the electric field causes the helical structures to unwind and convert the liquid crystals 204 and 206 from the cholesteric phase to a nematic phase. In other words, the helical structures are dynamically removed in the transmission state. As shown in FIG. 2D, in the transmission state, all incident spectral light (e.g., 216 of FIG. 2C) in the spectral light sub-band 224 is transmitted through the LC layers 200, 202 of the optical filter 114 to the sensor array with high efficiency. Also, all incident IR light (e.g., 222 of FIG. 2C) in the IR light sub-band 226 is transmitted through the LC layers 200, 202 of the optical filter. In other words, the LC layers 200, 202 effectively become glass slabs when the LC layers 200, 202 are placed in the transmission state. For example, all of the LC layers of the optical filter 114 may be switched to the transmission state when the camera is used for monochrome imaging. In other implementations, the LC layers may be configured to block IR light when the LC layers are in the transmission state.

It will be appreciated that the LC layers 200, 202 may be representative of any suitable matched pair of LC layers included in optical filter 114. Optical filter 114 may include any suitable number of matched pairs of LC layers that are each polarization insensitive. In some implementations, optical filter 114 may include a plurality of different matched pairs of LC layers that are configured to block spectral light in different spectral light sub-bands when those matched pairs are in the reflection state. Accordingly, in such implementations, different LC layers of the optical filter may be individually switched from the transmission state to the reflection state to tune the optical filter to block spectral light in all but a selected spectral light sub-band.

In one example, a LC layer may be designed such that the center wavelength corresponds to a first wavelength by using a pitch $P_1$ (e.g. $\lambda_1 = nP_1 \cos\theta$) with preferably a narrow bandwidth ($\Delta\lambda 1 = \Delta nP_1$). Narrow bandwidth can be achieved for example by using an LC with small birefringence ($\Delta n$). This layer would act as an optical filter for a narrowband spectrum of light centered at $\lambda_1$. Similarly, another LC layer may be designed such that the center wavelength corresponds to a second, different wavelength by using a pitch $P_2$ (e.g. $\lambda_2 = nP_2 \cos\theta$) and so on. Multiple LC layers may be stacked together, and the selected spectral light sub-band that is transmitted though such a stack of LC layers can be varied among different wavelengths ($\lambda_1, \lambda_2, \ldots \lambda_N$) and/or different bandwidths.

In the depicted implementation, optical filter 114 is switched to the transmission state when a voltage is applied to electrodes 208, 210, and switched to the reflection state when a voltage is not applied to electrodes 208, 210. It will be appreciated that optical filter 114 may be configured based on the anticipated duty cycle, to conserve power—i.e., if the anticipated duty cycle calls for the optical filter to be in the transmission state more often than the reflection state, then the optical filter may be in the transmission state by default, when there is no energy provided to the electrodes. Conversely, if the anticipated duty cycle calls for the optical filter to be in the reflection state more often than in the transmission state, then the optical filter may be in the reflection state by default, when there is no voltage provided to the electrodes. In some implementations, a common voltage may be used to bias electrodes 208, 210 to control the two LC layers 200, 202 in parallel. In other words, a plurality of layers of optical filter 114 may be controlled in parallel using a common voltage to switch the plurality of layers between different states.

In the example illustrated in FIGS. 2A-2D, the first and second LC layers 200, 202 include liquid crystals that are configured to form helical structures that reflect different handed circularly polarized light (e.g., first LC layer 200 reflects RHCP light and second LC layer 202 reflects LHCP light). In some implementations, optical filter 114 may include a stack of LC layers each configured to reflect circularly polarized light of a same handedness. In such implementations, two such layers may be separated by one or more wave plates (e.g., one half-wave plate, or two quarter-wave plates) configured to convert the handedness of circularly polarized light.

Figure 3A:
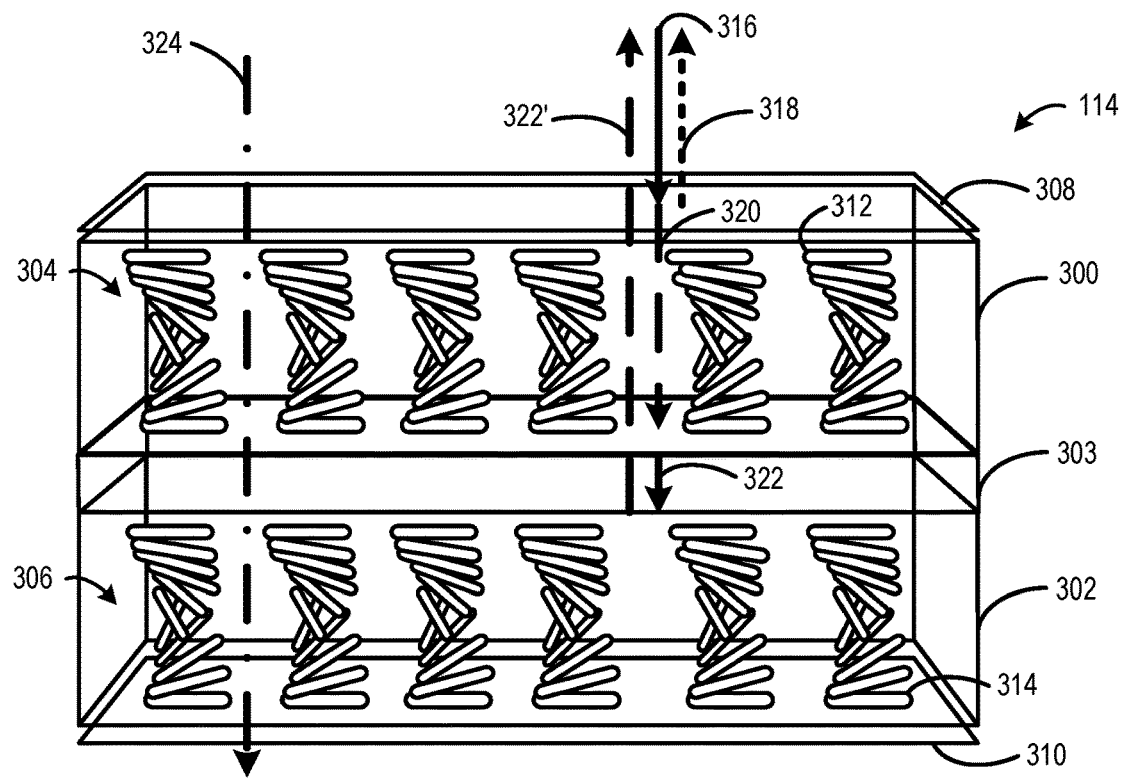
FIGS. 3A-3B schematically show aspects of another example implementation of an optical filter.
Figure 3B:
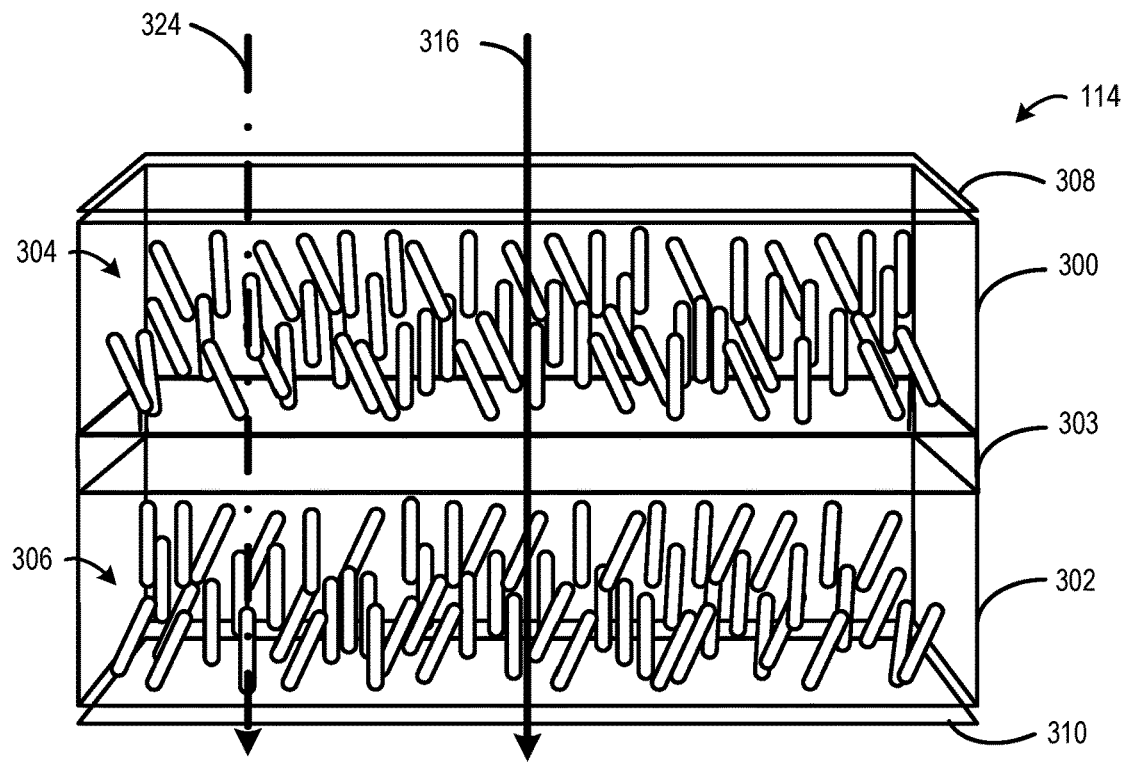

FIGS. 3A-3B schematically show aspects of a pair of LC layers configured to block circularly polarized light of a same handedness. The depicted LC layers may be included in optical filter 114 of FIG. 1. LC layers 300 and 302 may be representative of one of a plurality of matched pairs of LC layers of the optical filter. LC layers 300, 302 may be individually switchable between the reflection state and the transmission state by applying a voltage across the LC layers 300, 302 via electrodes 308, 310. LC layers 300, 302 may be configured to, in the reflection state, block spectral light in the same spectral light sub-band and transmit spectral light outside of the spectral light sub-band. Further, LC layers 300, 302 may be configured to, in the transmission state, transmit spectral light in the spectral light sub-band along with spectral light outside the spectral light sub-band.

The LC layer 300 includes a first plurality of liquid crystals 304 and the LC layer 302 includes a second plurality of liquid crystals 306. The first and second pluralities of liquid crystals 304, 306 are configured to dynamically form cholesteric phase structures that block light in a spectral light sub-band and transmit light outside of the spectral light sub-band in the reflection state. Furthermore, the first and second pluralities of liquid crystals 304, 306 are each configured to dynamically form a nematic phase arrangement that transmits light in the spectral light sub-band along with light outside the spectral light sub-band in the transmission state.

The first plurality of liquid crystals 304 may be configured in the same manner as the second plurality of liquid crystals 306 such that liquid crystals selectively reflect the same type of polarized light. In particular, the first plurality of liquid crystals 304 may be configured to reflect right-handed circularly polarized light in the reflection state and the second plurality of liquid crystals 306 may be configured to reflect right-handed circularly polarized light in the reflection state.

A wave plate 303 is positioned in between the first LC layer 300 and the second LC layer 302. Wave plate 303 may be configured to convert circularly polarized light of one type of handedness into circularly polarized light of another type of handedness. In the depicted example, wave plate 303 is configured to convert LHCP light into RHCP light. The first and second pluralities of liquid crystals 304, 306 and wave plate 303 may cooperate to make the optical filter 114 polarization-insensitive.

It will be appreciated that any suitable polarization converting optical component may be employed to change the polarization of light in between the LC layers 300, 302. In another example, two quarter-wave plates may be employed instead of the half-wave plate.

In FIG. 3A, an activation voltage is not applied to electrodes 308, 310 such that the LC layers 300, 302 are in the reflection state. In the reflection state, the liquid crystals 304 and 306 are in the CLC phase such that the liquid crystals 304, 306 rotate about an axis parallel to an optical axis of the camera to form helical structures. In the illustrated example, the liquid crystals 304 in the LC layer 300 form helical structures 312 having right-handed rotation about the rotational axis. In other words, the helical structures 312 are twisted counter-clockwise. Further, the liquid crystals 306 in the LC layer 302 form helical structures 314 having right-handed rotation about the rotational axis. In other words, the helical structures 314 are twisted counter-clockwise.

When unpolarized spectral light 316 in a spectral light sub-band that is blockable by the LC layers 300, 302 is incident on the LC layer 300, RHCP light 318 that matches the handedness of the helical structures 312 in the LC layer 300 is reflected back by the helical structures 312. The remaining LHCP light 320 is transmitted through the LC layer 300 with minimal change. When the LHCP light 320 is incident on wave plate 303, the LHCP light 320 is converted into RHCP light 322. The RHCP light 322 is transmitted through the wave plate 303 to the LC layer 302. The helical structures 314 reflect the LHCP light 322'. This reflected LHCP light 322' is transmitted back through the LC layer 300 in the return path. Accordingly, all the unpolarized spectral light 316 within the spectral light sub-band is substantially reflected by the LC layers 300, 302 of the optical filter 114. Furthermore, in the reflection state, IR light 324 in the IR light sub-band is transmitted with high efficiency independent of its polarization through the LC layers 300, 302 of the optical filter 114. Accordingly, when the optical filter is in the reflection state, the optical filter 114 can be used for IR/depth imaging without interference from impinging spectral light outside of the IR light sub-band (e.g. visible light). In other implementations, the LC layers may be configured to block IR light when the LC layers are in the reflection state.

In FIG. 3B, an activation voltage is applied to each of the transparent conductors 308, 310 that generates an electric field across the LC layers 300, 302 to switch the LC layers 300, 302 to the transmission state. In particular, the electric field causes the helical structures to unwind and convert the liquid crystals 304 and 306 from the cholesteric phase to the nematic phase. In other words, the helical structures are dynamically removed in the transmission state. In the transmission state, all incident spectral light 316 in the spectral light sub-band is transmitted through the LC layer 300, the wave plate 303, and the LC layer 302 of the optical filter 114 to the sensor array with high efficiency. Also, all incident IR light 324 in the IR light sub-band is transmitted through the LC layer 300, the wave plate 303, and the LC layer 302 of the optical filter.

In another example, optical filter 114 may include a first LC layer configured to reflect RHCP light, a second LC layer configured to reflect RHCP light, and a half-wave plate sandwiched between the first LC layer and the second LC layer. In this example, when unpolarized spectral light in a spectral light sub-band that is blockable by the LC layers is incident on the first LC layer, RHCP light s reflected back by the helical structures of the first LC layer. The remaining LHCP light is transmitted through the first LC layer with minimal change. When the LHCP light is incident on the half-wave plate the LHCP light is converted into RHCP light. The RHCP light is transmitted through the half-wave plate to the second LC layer. The helical structures of the second LC layer reflect the RHCP light back through the half-wave plate and through the first LC layer. Accordingly, all the unpolarized spectral light within the spectral light sub-band is substantially reflected by the LC layers of the optical filter 114. Note that in these examples the first and second LC layer include liquid crystals configured in the same manner (e.g., they form helical structures that reflect circularly polarized light having the same handedness). These alternative configurations may be polarization insensitive and may operate in a similar manner to the configuration illustrated in FIGS. 2A-2D.

Returning to FIG. 1, in some instances, the molecules of the LC layers of the optical filter 114 may act as scattering centers to incident light, causing some degree of ghosting and flare in acquired images. This phenomenon is typically more significant at lower wavelengths. In order to reduce the effects of scattering, optical filter 114 may be positioned as close to the sensor array 104 as possible—e.g., coupled directly to the sensor array 104 or to the microlens array 108 of the sensor array. For example, FIG. 1 schematically shows micro-pedestals 116 configured to couple the optical filter 114 very close to the sensor array 104.

An IR illuminator 118 is configured to emit active IR light to illuminate the subject 102. In one example, the IR illuminator 118 includes an IR laser configured to emit IR light. In some implementations, the IR illuminator 118 optionally may include a diffuser covering a field of illumination of the IR illuminator 118.

In some implementations, one or more spectral illuminators optionally may be included to provide active spectral illumination. When included, a plurality of spectral illuminators may be configured to emit active spectral light to illuminate the subject 102 in a plurality of different spectral light sub-bands. Each of the spectral illuminators may be individually controllable—e.g., a single spectral illuminator may be activated while the other spectral illuminators remain deactivated. The plurality of spectral illuminators may take any suitable form. In one example, the spectral illuminators include light emitting diodes configured to emit spectral light. There is not a theoretical limit on the number of spectral illuminators that may be used, nor on the spectral-light sub-bands that each spectral illuminator may be configured to emit.

In one example implementation, a camera may include, in addition to the IR source, six spectral illuminators respectively configured to emit deep blue (460 nm), blue (470 nm), true green (528 nm), yellow (587 nm), amber (617 nm), and red (625 nm). In an example implementation, each spectral illuminator may have a full width at half maximum (FWHM) of 20 nm, and a field of illumination (FOI) of 80 degrees. In some implementations, the spectral illuminators may emit light in other sub-bands, such as hyper-red, near IR, or IR.

In other implementations, a camera may include a broad-band illumination source, such as a white light source. The broad-band illumination source may be employed instead of the plurality of spectral illuminators. In some implementations, the broad-band illumination source may be modulated. In other implementations, the broad-band illumination source may be non-modulated.

Electronic controller machine 120 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded.

Electronic controller machine 120 is configured to switch optical filter 114 from the reflection state to the transmission state and, synchronously address sensor elements 106 of sensor array 104 to acquire a monochrome image. Further, electronic controller machine 120 is configured to switch optical filter 114 from the transmission state to the reflection state, synchronously modulate IR emitter 118, and address sensor elements 106 of sensor array 104 to acquire an IR image. For example, after the IR image is acquired, electronic controller machine 120 may switch optical filter 114 back to the reflection state, concurrently deactivate IR emitter 118, and address the sensor elements 106 of sensor array 104 for visible image acquisition. In other words, electronic controller machine 120 may be configured to control camera 100 to alternately acquire IR images and visible light images. In another example, electronic controller machine 120 may leave optical filter 114 in the reflection state and continue to modulate the IR emitter 118 and address sensors 106 of sensor array 104 to acquire additional IR images.

In some combined visible- and IR-imaging implementations, visible-image acquisition may take place over a longer interval than IR-image acquisition. For example, the switching time for optical filter 114 may be 5 milliseconds or less. Accordingly, two or more image acquisitions may be completed within a single video or image frame, effecting quasi-simultaneous imaging in two or more wavelength bands. It may be possible to achieve even lower switching times using appropriate LC materials, which would be advantageous, for example, in reducing motion blur between corresponding visible and IR images. More generally, the relative durations of the visible- and IR-image acquisition may vary depending on the expected use scenario (e.g., outdoor daytime use, where intense ambient illumination is present, versus indoor or night use). Further, in some implementations, electronic controller machine 120 may be configured to sense ambient-light conditions and vary the closed and open durations accordingly. To this end, a non-imaging illumination sensor 122 may be operatively coupled to electronic controller machine 120, or sensor array 104 itself may provide illumination-sensing functionality.

The term 'modulate' as applied to IR emitter 118 may include activating or deactivating the IR emitter, and, in some implementations, periodically varying the intensity of the IR emission at a high frequency (e.g., 100 MHz). The term 'address' as applied to sensors 106 of sensor array 104 may have a somewhat different meaning depending on the imaging mode described. For flat-imaging—both visible and IR—addressing the sensors 106 may include integrating the intensity of light received at each sensor 106 and associating the integrated intensity with the portion of the image corresponding to that element. For depth imaging, the sensors 106 may be addressed differently. Here, addressing the sensors 106 may include resolving a phase offset from each sensor element relative to the periodic modulation of the IR emitter. The phase offset, optionally converted into the depth domain, may be associated with the portion of the image corresponding to the sensor element addressed. In some implementations, a series of IR acquisitions in rapid succession may be used to obtain the phase offset. In combination depth- and flat-imaging applications, both of the above addressing modes may be used in an alternating (i.e., multiplexed) manner synchronously timed with corresponding switching the state of optical filter 114.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions (Xi, Yi) of an imaged scene, with a depth value Zi indicating, for each pixel, the depth of the corresponding region. 'Depth' is defined as a coordinate parallel to the optical axis of the camera, which increases with increasing distance from the camera. Operationally, some depth-imaging cameras may be configured to acquire 2D image data, from which a depth map is obtained via downstream processing. The term 'depth video' refers herein to a time-resolved sequence of depth maps.

The configuration of a depth-imaging camera may differ from one implementation to the next. In one example, brightness or color data from two, stereoscopically oriented sensor arrays in a depth-imaging camera may be co-registered and used to construct a depth map. More generally, depth coordinates into a scene may be obtained using one or more flat-imaging cameras, with optical-tomography based co-registration of imaged features. Hyperspectral (e.g., visible+IR and/or UV) flat imaging may be used with this approach, for improved feature discrimination. In other examples, an illumination source associated with a depth-imaging camera may be configured to project onto the subject a structured illumination pattern comprising numerous discrete features—e.g., lines or dots. A sensor array in the depth-imaging camera may be configured to image the structured illumination reflected back from the subject. Based on the spacings between adjacent features in the various regions of the imaged subject, a depth map of the subject may be constructed. In time-of-flight (ToF) implementations, the illumination source—an IR emitter—may project pulsed or otherwise modulated IR illumination towards the subject. The sensor array of the depth-imaging camera may be configured to detect the phase offset between the illumination reflected back from the subject and the modulated emission. In some implementations, the phase offset of each sensor element may be converted into a pixel-resolved time-of-flight of the pulsed illumination, from the illumination source to the subject and then to the array. ToF data may then be converted into depth.

Electronic controller machine 120 is configured to output a matrix of pixels 126. Each pixel in the matrix includes a depth value ($Z_i$) and one or more spectral values (e.g., $SV1_i$, $SV2_i$, ...) that may represent intensity of different spectral light sub-bands (e.g., different colors). Electronic controller machine 120 may be configured to output the matrix of pixels 126 in any suitable form. In some examples, electronic controller machine 120 may output the matrix of pixels 126 as a data structure in which each element of the matrix corresponds to a different pixel, and each element of the matrix includes an array of values corresponding to the depth value and the spectral values for that pixel. In one example, electronic controller machine 120 is configured to output a depth image and a visible light image.

Further, note that electronic controller machine 120 may be configured to output the matrix of pixels 126 (and/or any other suitable parameter value) to any suitable recipient internal or external to the camera 100. For example, electronic controller machine 120 may be configured to output the matrix of pixels 126 to another processing component for additional image processing (e.g., filtering, computer vision). In some examples, the processing component may be incorporated into the camera 100. In some examples, the processing component may be incorporated into a remote computing device in communication with the camera 100. In another example, electronic controller machine 120 may be configured to output the matrix of pixels 126 to an external display device for visual presentation as one or more images.

An optical filter configured as described herein for a single-chip depth and visible camera provides significant advantages, such as wavelength selectivity, high transmission in both visible and near infrared spectrums, high contrast, wide angular range, low cost, low power operation, and fast response time.

In some implementations, optical filter 114 may include a plurality of different LC layers configured to be individually switchable to the reflection state to block spectral light in different spectral light sub-bands. FIGS. 4A-4F schematically show different ways in which optical filter 114 may be tuned to reflect/transmit spectral light in different spectral light sub-bands. Optical filter 114 is shown in simplified form including six liquid crystal layers 400 (e.g., 400A, 400B, 400C, 400D, 400E, 400F) each configured to block spectral light in a different spectral light sub-band in the reflection state. Although not shown, optical filter 114 may include additional LC layers configured to block different handed polarized light as described above such that the optical filter is polarization insensitive.

Figure 4A:
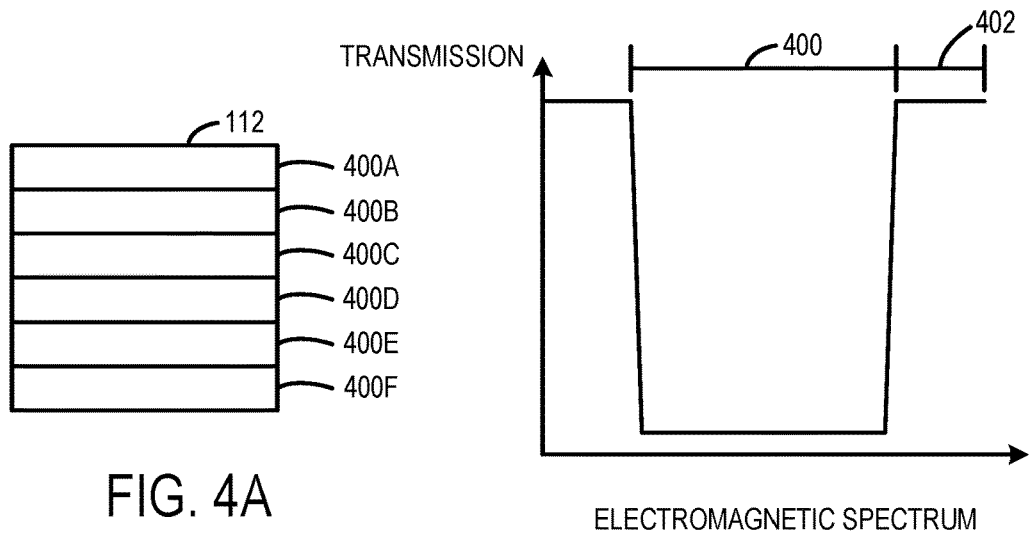
FIGS. 4A-4F schematically show different ways in which an optical filter may be tuned to reflect/transmit spectral light in different spectral light sub-bands.

In FIG. 4A, all of the LC layers 400 are switched to the reflection state such that optical filter 114 is tuned to block spectral light in the spectral light sub-band 400. For example, the spectral light sub-band 400 may correspond to the visible light sub-band (e.g., ~390 to 700 nm). Additionally, optical filter 114 is configured to transmit IR light in the IR light sub-band 402.

Figure 4B:
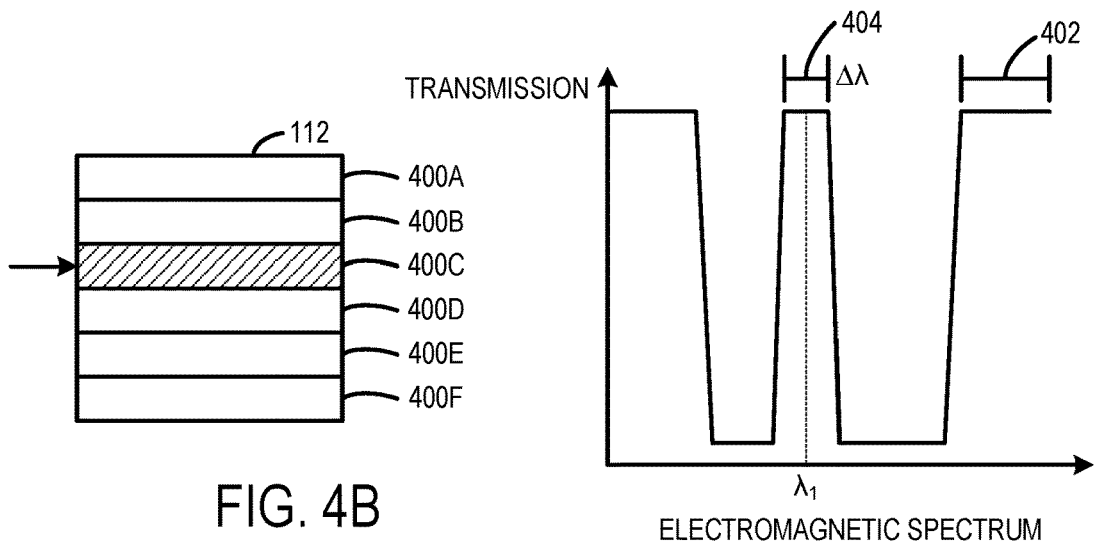

In FIG. 4B, a voltage is applied only to LC layer 400C to switch the LC layer from the reflection state to the transmission state. The other LC layers 400A, 400B, 400D, 400E, 400F are switched to the reflection state. In this way, optical filter 114 is tuned to block spectral light in all but the spectral light sub-band 404 corresponding to the LC layer 400C. The spectral light sub-band 404 has a center wavelength ($\lambda 1$) and a bandwidth ($\Delta\lambda$). IR light in IR light sub-band 402 is still transmitted.

Figure 4C:
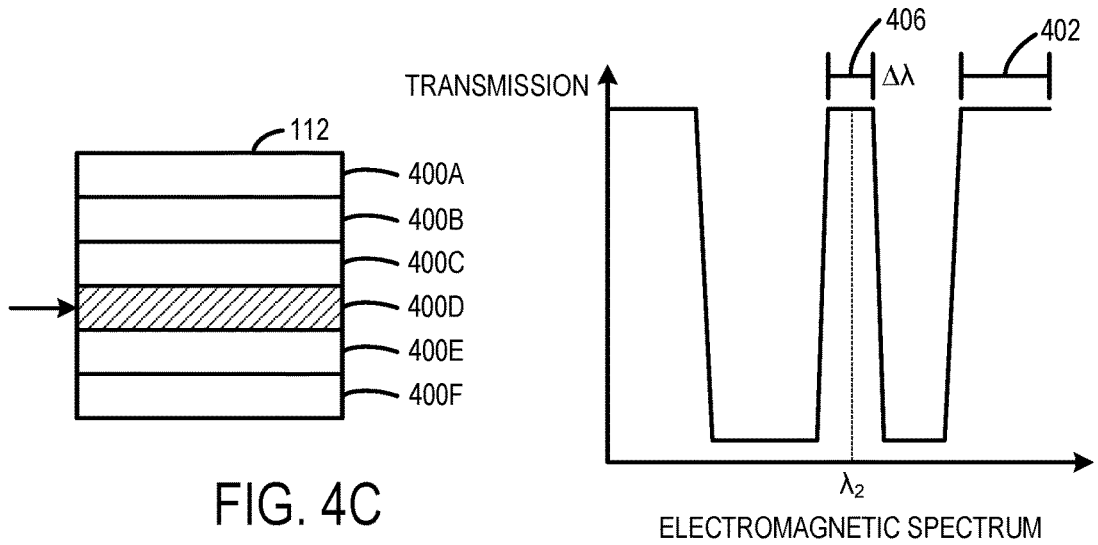

In FIG. 4C, a voltage is applied only to LC layer 400D to switch the LC layer from the reflection state to the transmission state. The other LC layers 400A, 400B, 400C, 400E, 400F are switched to the reflection state. In this way, optical filter 114 is tuned to block spectral light in all but the spectral light sub-band 406 corresponding to the LC layer 400D. The spectral light sub-band 406 has a center wavelength ($\lambda 2$) and a bandwidth ($\Delta\lambda$). In this example, the selected spectral light sub-band 406 is shifted higher up the electromagnetic spectrum relative to the spectral light sub-band 404 of FIG. 4B. IR light in IR light sub-band 402 is still transmitted.

Figure 4D:
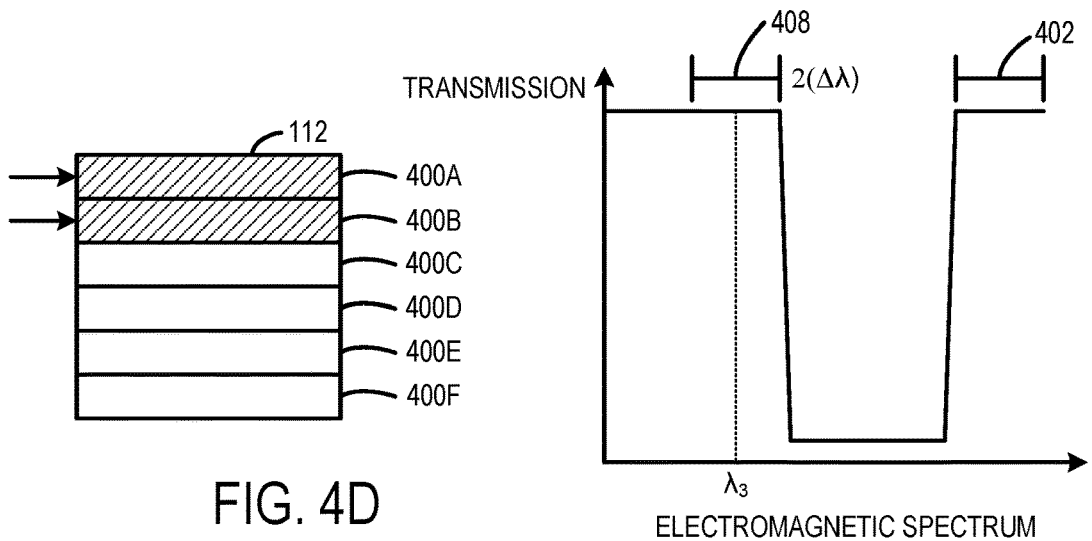

In FIG. 4D, a voltage is applied only to LC layers 400A, 400B to switch the LC layers from the reflection state to the transmission state. The other LC layers 400C, 400D, 400E, 400F are switched to the reflection state. In this way, optical filter 114 is tuned to block spectral light in all but the spectral light sub-band 408 corresponding to the LC layers 400A, 400B. The spectral light sub-band 408 has a center wavelength ($\lambda 3$) and a bandwidth ($2(\Delta\lambda)$). In this example, the selected spectral light sub-band 406 is shifted lower down the electromagnetic spectrum and the bandwidth of the spectral light sub-band 408 is increased relative to the spectral light sub-band 406 of FIG. 4C. In this example, optical filter 114 may be tuned to operate as a high pass-filter. IR light in IR light sub-band 402 is still transmitted.

Figure 4E:
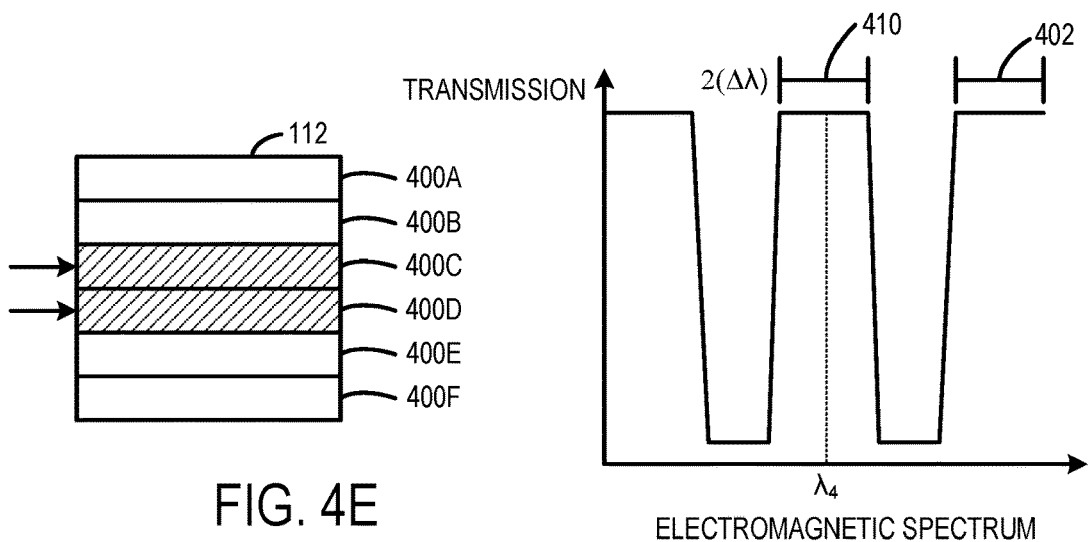

In FIG. 4E, a voltage is applied only to LC layers 400C, 400D to switch the LC layers from the reflection state to the transmission state. The other LC layers 400A, 400B, 400E, 400F are switched to the reflection state. In this way, optical filter 114 is tuned to block spectral light in all but the spectral light sub-band 410 corresponding to the LC layers 400C, 400D. The spectral light sub-band 410 has a center wavelength ($\lambda 4$) and a bandwidth ($2(\Delta\lambda)$). In this example, the selected spectral light sub-band 410 is shifted higher up the electromagnetic spectrum relative to the spectral light sub-band 408 of FIG. 4D. IR light in IR light sub-band 402 is still transmitted.

Figure 4F:
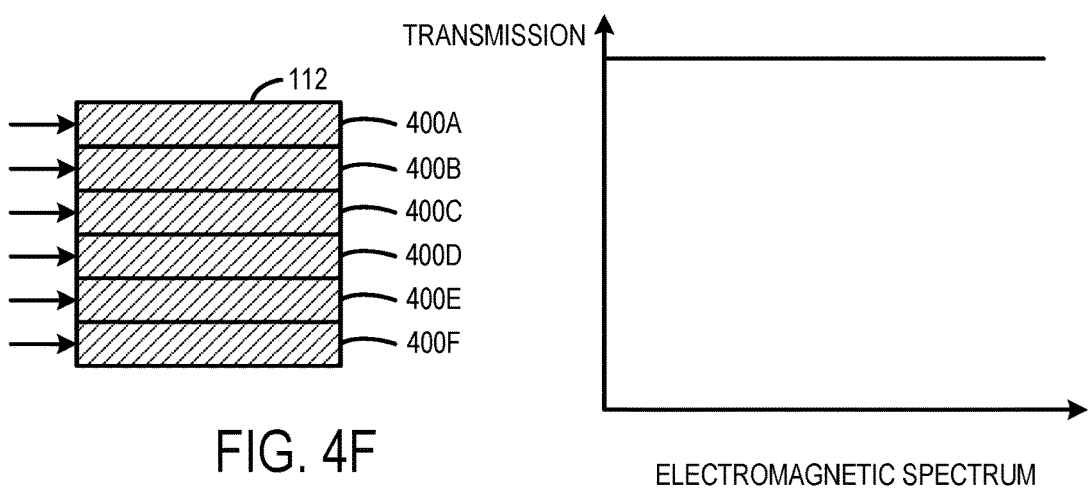

In FIG. 4F, a voltage is applied to all of the LC layers 400 to switch the LC layers from the reflection state to the transmission state. In this way, optical filter 114 is tuned to transmit all spectral light and IR light.

It will be appreciated that optical filter 114 may be configured to be tuned to block spectral light in all but any suitable selected spectral light sub-band. Moreover, optical filter 114 may be tuned to any suitable number of different spectral light sub-bands. Such a multi-layer optical filter configuration provides a wide range of accessible wavelengths (e.g., ~400 nm up to ~1 um). Further, such an optical filter configuration may allow for different spectral light sub-bands (e.g., visible light sub-band) and NIR light sub-band to be independently switched by separate LC layers between the reflection and transmission states. Further still, such an optical filter configuration allows for simultaneous switching of multiple wavelength sub-bands that are separate from each other.

Figure 5:
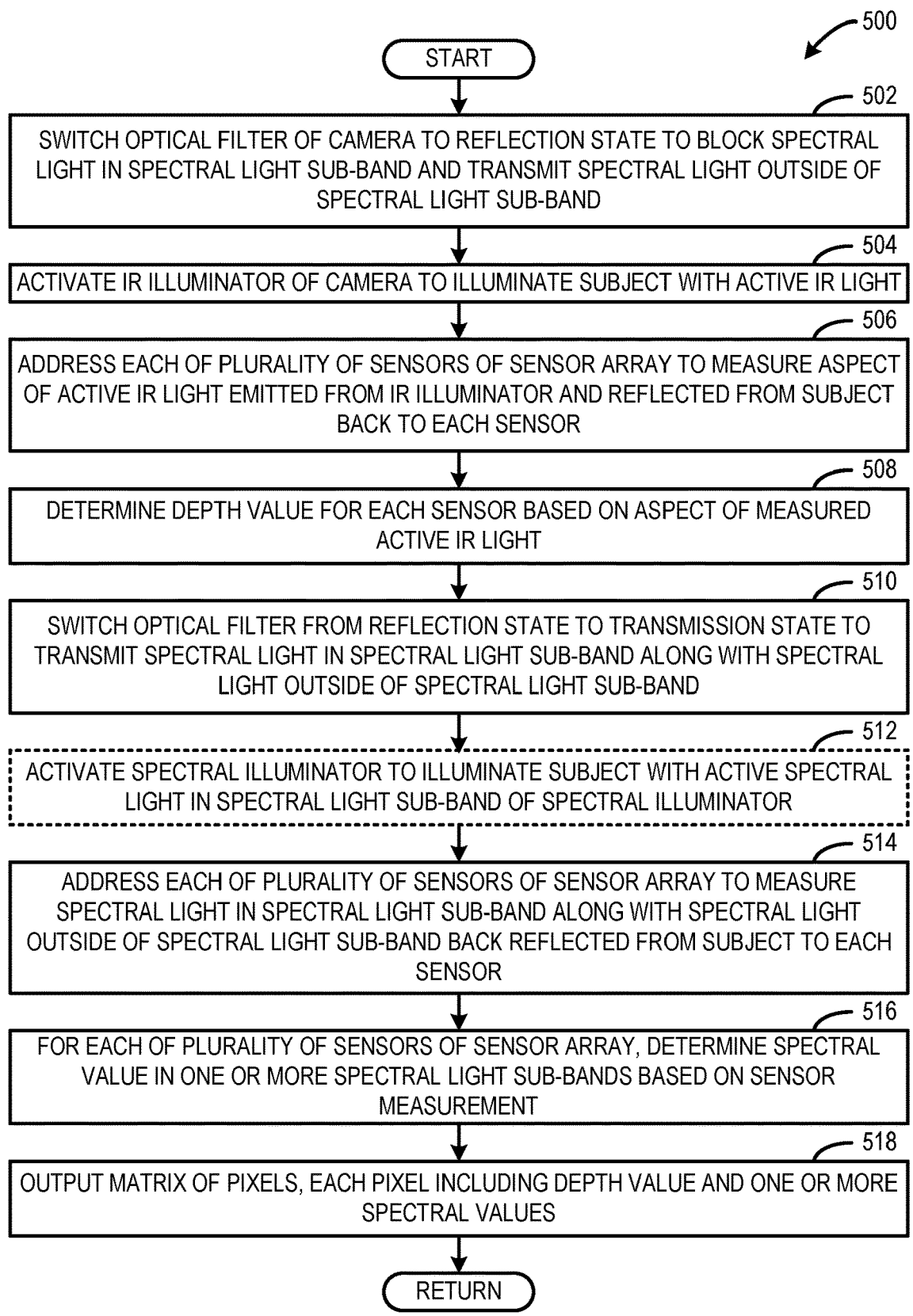
FIG. 5 shows an example image acquisition method.

FIG. 5 shows an example image acquisition method 500 using an optical filter as described herein. For example, method 500 may be enacted by electronic controller machine 120 of camera 100. At 502 of method 500, an optical filter of a camera is switched to a reflection state. In the reflection state, the optical filter is configured to block spectral light in a spectral light sub-band and transmit spectral light outside of the spectral light sub-band. In particular, the optical filter includes a first plurality of liquid crystals configured to dynamically form cholesteric phase structures in the reflection state that block right-handed circularly polarized light in a spectral light sub-band and transmit light outside of the spectral light sub-band. The optical filter further includes a second plurality of liquid crystals configured to dynamically form cholesteric phase structures in the reflection state that block left-handed circularly polarized light in the spectral light sub-band and transmit light outside of the spectral light sub-band. For example, when the optical filter is switched to the reflection state, the optical filter may block visible light and transmit IR light regardless of polarization of the light.

At 504 of method 500, an IR illuminator of the camera is activated to illuminate a subject with active IR light. At 506 of method 500, each of a plurality of sensors of a sensor array of the camera is addressed to measure an aspect of the active IR light emitted from the IR illuminator and reflected from the subject back to each of the sensors. For example, a measured aspect may include intensity, phase offset, or another suitable aspect. At 508 of method 500, a depth value is determined for each of the sensors based on the measured active IR light. At 510, the optical filter is switched from the reflection state to the transmission state to transmit spectral light in the spectral light sub-band along with spectral light outside the spectral light sub-band. In particular, in the transmission state, the first and second pluralities of liquid crystals of the optical filter dynamically form a nematic phase arrangement that transmits light in the spectral light sub-band. For example, when the optical filter is switched to the transmission state, the optical filter may transmit visible light and IR light. In one example, the optical filter is switched from the reflection state to the transmission state by applying a voltage to LC layers of the optical filter.

In some implementations, the camera optionally may include one or more active spectral illumination sources (e.g., modulated wide-band spectral illuminator, non-modulated wide-band spectral illuminator, plurality of narrow-band spectral illuminators). In some such implementations, at 512 of method 500, a spectral illuminator of the camera optionally may be activated to illuminate the subject with active spectral light in a spectral light sub-band of the spectral illuminator.

At 514 of method 500, each of the plurality of sensors of the sensor array are addressed to measure spectral light in the spectral light sub-band along with spectral light outside of the spectra light sub-band that is back reflected from the subject to each of the sensors. At 516 of method 500, for each of the plurality of sensors of the sensor array, a spectral value for each of one or more spectral light sub-bands is determined based on the sensor measurements. In one example, the spectral values may correspond to red, green, blue spectral light sub-bands. In another example, a single spectral value may represent an intensity value for a monochrome image. In another example, a plurality of spectral values may correspond to a plurality of different spectral light sub-bands of a multi-spectral/hyper-spectral image. At 518 of method 500, a matrix of pixels is outputted. Each pixel of the matrix includes the depth value and the one or more spectral values that correspond to a sensor of the sensor array. Method 500 may be performed repeatedly to acquire IR and spectral light images having high signal-to-noise ratio using the same sensor array.

In some implementations, the methods and processes described herein may be tied to a computing system of one or more computing devices. In particular, such methods and processes may be implemented as a computer-application program or service, an application-programming interface (API), a library, and/or other computer-program product.

Figure 6:
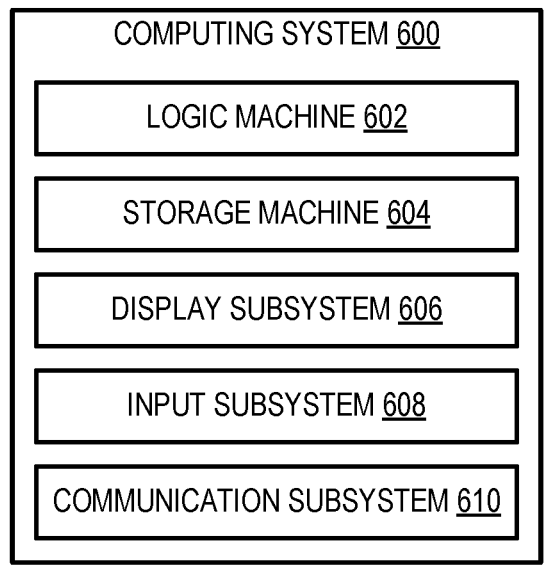
FIG. 6 shows an example computing system.

FIG. 6 schematically shows a non-limiting implementation of a computing system 600 that can enact one or more of the methods and processes described above. Computing system 600 is shown in simplified form. For example, computing system 600 may take the form of camera 100 or electronic controller machine 120 of FIG. 1.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine 602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 602 may include one or more processors configured to execute software instructions. Additionally or alternatively, the logic machine 602 may include one or more hardware or firmware logic machines configured to execute hardware or firmware instructions. Processors of the logic machine 602 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 602 may be virtualized and executed by remotely accessible, networked computing devices configured in a cloud-computing configuration.

Storage machine 604 includes one or more physical devices configured to hold instructions executable by the logic machine 602 to implement the methods and processes described herein. When such methods and processes are implemented, the state of storage machine 604 may be transformed—e.g., to hold different data.

Storage machine 604 may include semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of display images translating matrix of pixels 126 into a visual format perceivable by a human. As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem 610 may be configured for communication via a wireless telephone network, or a wired or wireless local- or wide-area network. In some embodiments, the communication subsystem 610 may allow computing system 600 to send and/or receive messages to and/or from other devices via a network such as the Internet.

In an example, an optical filter for a camera switchable between a reflection state and a transmission state comprises a first plurality of liquid crystals configured to dynamically form cholesteric phase structures in the reflection state that block right-handed circularly polarized light in a spectral light sub-band and transmit light outside of the spectral light sub-band, and dynamically form a nematic phase arrangement in the transmission state that transmits light in the spectral light sub-band; and a second plurality of liquid crystals configured to dynamically form cholesteric phase structures in the reflection state that block left-handed circularly polarized light in the spectral light sub-band and transmit light outside of the spectral light sub-band, and dynamically form a nematic phase arrangement in the transmission state that transmits light in the spectral light sub-band. In this example and/or other examples, the optical filter may be configured to transmit infrared (IR) light in an IR light sub-band in both the transmission state and the reflection state. In this example and/or other examples, the optical filter may be configured to block substantially all visible light in all visible light sub-bands when the optical filter is in the reflection state. In this example and/or other examples, the optical filter may be configured to transmit visible light in all visible light sub-bands when the optical filter is in the transmission state. In this example and/or other examples, at least one of the first plurality of liquid crystals may have a gradient pitch over which the liquid crystals rotate to dynamically form the cholesteric phase structures and the second plurality of liquid crystals include liquid crystals may have a gradient pitch over which the liquid crystals rotate to dynamically form the cholesteric phase structures. In this example and/or other examples, the first and second pluralities of liquid crystals may have a birefringence less than 0.4. In this example and/or other examples, the first and second pluralities of liquid crystals may have a birefringence greater than 0.5. In this example and/or other examples, the optical filter may include a plurality of liquid crystal layers. In this example and/or other examples, the first plurality of liquid crystals may be included in a first layer of the plurality of layers, and the second plurality of liquid crystals may be included in a second layer of the plurality of layers. In this example and/or other examples, different liquid crystal layers of the plurality of liquid crystal may be configured to block spectral light in different spectral light sub-bands and transmit spectral light outside of the spectral light sub-bands in the reflection state, and to transmit spectral light in those different spectral light sub-bands in the transmission state. In this example and/or other examples, different liquid crystal layers of the plurality of liquid crystal may be configured to block spectral light in different spectral light sub-bands such that the optical filter is configured to block spectral light across a wide band when the optical filter is in the reflection state. In this example and/or other examples, the first and second pluralities of liquid crystals may be included in a same layer of the optical filter.

In an example, a camera comprises a sensor array including a plurality of sensors, an optical filter for the sensor array switchable between a reflection state and a transmission state, the optical filter includes a first plurality of liquid crystals configured to dynamically form cholesteric phase structures that in the reflection state block right-handed circularly polarized light in a spectral light sub-band and transmit light outside of the spectral light sub-band, and dynamically form a nematic phase arrangement in the transmission state that transmits light in the spectral light sub-band, and a second plurality of liquid crystals configured to dynamically form cholesteric phase structures in the reflection state that block left-handed circularly polarized light in the spectral light sub-band and transmit light outside of the spectral light sub-band, and dynamically form a nematic phase arrangement in the transmission state that transmits light in the spectral light sub-band, and a controller machine configured to switch the optical filter to the reflection state to block spectral light in the spectral light sub-band, address the sensors of the sensor array while the optical filter is in the reflection state, switch the optical filter to the transmission state to allow transmission of spectral light in the spectral light sub-band, and address the sensors of the sensor array while the optical filter is in the transmission state. In this example and/or other examples, the optical filter may be configured to transmit infrared (IR) light in an IR light sub-band in both the transmission state and the reflection state. In this example and/or other examples, the optical filter may be configured to block substantially all visible light in all visible light sub-bands when the optical filter is in the reflection state. In this example and/or other examples, the optical filter may include a plurality of liquid crystal layers, different liquid crystal layers of the plurality of liquid crystal layers may be configured to block spectral light in different spectral light sub-bands and transmit spectral light outside of the spectral light sub-bands in the reflection state, and to transmit spectral light in the spectral light sub-band in the transmission state. In this example and/or other examples, the controller machine may be configured to adjust one or more of a center wavelength of the selected spectral light sub-band and a bandwidth of the selected spectral light sub-band by switching one or more liquid crystal layers from the transmission state to the reflection state. In this example and/or other examples, the camera may further comprise an IR illuminator configured to emit active IR light in an IR light sub-band, and the controller machine may be configured to activate the IR illuminator to illuminate a subject with the active IR light while the optical filter is in the reflection state, determine, for each of the plurality of sensors of the sensor array, a depth value indicative of a depth of the subject based on a measured aspect of the active IR light emitted from the IR illuminator and reflected from the subject back to each of the plurality of sensors. In this example and/or other examples, the plurality of sensors of the sensor array may be differential sensors, and the controller machine may be configured to activate the IR illuminator in synchrony with addressing the differential sensors of the sensor array to differentially measure the measured aspect of the active IR light emitted from the IR illuminator and reflected from the subject back to each of the plurality of sensors.

In an example, a method comprises switching an optical filter of a camera to a reflection state to block spectral light in a spectral light sub-band, the optical filter including a first plurality of liquid crystals configured to dynamically form cholesteric phase structures that in the reflection state block right-handed circularly polarized light in a spectral light sub-band and transmit light outside of the spectral light sub-band, and a second plurality of liquid crystals configured to dynamically form cholesteric phase structures in the reflection state that block left-handed circularly polarized light in the spectral light sub-band and transmit light outside of the spectral light sub-band, activating an IR illuminator of the camera to illuminate a subject with the active IR light while the optical filter is in the reflection state, addressing each of a plurality of sensors of a sensor array of the camera while the optical filter is in the reflection state, determining, for each of the plurality of sensors of the sensor array, a depth value indicative of a depth of the subject based on a measured aspect of the active IR light emitted from the IR illuminator and reflected from the subject back to each of the plurality of sensors, switching the optical filter to a transmission state to allow transmission of spectral light in the spectral light sub-band, wherein the first plurality of liquid crystals is configured to dynamically form a nematic phase arrangement in the transmission state that transmits light in the spectral light sub-band, and the second plurality of liquid crystals is configured to dynamically form a nematic phase arrangement in the transmission state that transmits light in the spectral light sub-band, addressing the sensors of the sensor array while the optical filter is in the transmission state, and determining, for each of the plurality of sensors of the sensor array, one or more spectral light values based on one or more measurements of the sensor.

In an example, an optical filter for a camera switchable between a reflection state and a transmission state comprises a first layer of liquid crystals configured to dynamically form cholesteric phase structures in the reflection state that block circularly polarized light of a first handedness in a spectral light sub-band and transmit light outside of the spectral light sub-band, and dynamically form a nematic phase arrangement in the transmission state that transmits light in the spectral light sub-band, a second layer of liquid crystals configured to dynamically form cholesteric phase structures in the reflection state that block circularly polarized light in the first handedness the spectral light sub-band and transmit light outside of the spectral light sub-band, and dynamically form a nematic phase arrangement in the transmission state that transmits light in the spectral light sub-band, and a wave plate positioned in between the first layer of liquid crystals and the second layer of liquid crystals and configured to convert circularly polarized light of a second handedness to circularly polarized light of the first handedness. In this example and/or other examples, the wave plate may be a half-wave plate. In this example and/or other examples, the circularly polarized light of the first handedness may be right-handed circularly polarized light, and the circularly polarized light of the second handedness may be left-handed circularly polarized light. In this example and/or other examples, the circularly polarized light of the first handedness may be left-handed circularly polarized light, and where the circularly polarized light of the second handedness is right-handed circularly polarized light.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera comprising:
an infrared (IR) illuminator configured to emit active IR light in an IR light sub-band;
a sensor array including a plurality of sensors;
an optical filter for the sensor array switchable between a reflection state and a transmission state, the optical filter including:
a first plurality of liquid crystals configured to
dynamically form cholesteric phase structures that in the reflection state block right-handed circularly polarized light in a spectral light sub-band and transmit light outside of the spectral light sub-band, and
dynamically form a nematic phase arrangement in the transmission state that transmits light in the spectral light sub-band, and a second plurality of liquid crystals configured to
dynamically form cholesteric phase structures in the reflection state that block left-handed circularly polarized light in the spectral light sub-band and transmit light outside of the spectral light sub-band, and
dynamically form a nematic phase arrangement in the transmission state that transmits light in the spectral light sub-band, wherein the optical filter is configured to transmit IR light in an IR light sub-band in both the transmission state and the reflection state; and
a controller machine configured to:
switch the optical filter to the reflection state to block spectral light in the spectral light sub-band,
activate the IR illuminator to illuminate a subject with the active IR light while the optical filter is in the reflection state,
address the sensors of the sensor array while the optical filter is in the reflection state,
determine, for each of the plurality of sensors of the sensor array, a depth value indicative of a depth of the subject based on a measured aspect of the active IR light emitted from the IR illuminator and reflected from the subject back to each of the plurality of sensors,
switch the optical filter to the transmission state to allow transmission of spectral light in the spectral light sub-band,
deactivate the IR illuminator such that the IR illuminator does not emit active IR light while the optical filter is in the transmission state, and
address the sensors of the sensor array while the optical filter is in the transmission state.

2. The camera of claim 1, wherein the optical filter is configured to block substantially all visible light in all visible light sub-bands when the optical filter is in the reflection state.

3. The camera of claim 1, where the optical filter includes a plurality of liquid crystal layers, where different liquid crystal layers of the plurality of liquid crystal layers are configured to block spectral light in different spectral light sub-bands and transmit spectral light outside of the spectral light sub-bands in the reflection state, and to transmit spectral light in the spectral light sub-band in the transmission state.

4. The camera of claim 3, wherein the controller machine is configured to adjust one or more of a center wavelength of the selected spectral light sub-band and a bandwidth of the selected spectral light sub-band by switching one or more liquid crystal layers from the transmission state to the reflection state.

5. The camera of claim 1, where the plurality of sensors of the sensor array are differential sensors, and where the controller machine is configured to activate the IR illuminator in synchrony with addressing the differential sensors of the sensor array to differentially measure the measured aspect of the active IR light emitted from the IR illuminator and reflected from the subject back to each of the plurality of sensors.

6. A method comprising:
switching an optical filter of a camera to a reflection state to block spectral light in a spectral light sub-band, the optical filter including a first plurality of liquid crystals configured to dynamically form cholesteric phase structures that in the reflection state block right-handed circularly polarized light in a spectral light sub-band and transmit light outside of the spectral light sub-band, and a second plurality of liquid crystals configured to dynamically form cholesteric phase structures in the reflection state that block left-handed circularly polarized light in the spectral light sub-band and transmit light outside of the spectral light sub-band, wherein the optical filter is configured to transmit IR light in an IR light sub-band different than the spectral light sub-band in the reflection state;

activating an IR illuminator of the camera to illuminate a subject with the active IR light while the optical filter is in the reflection state;

addressing each of a plurality of sensors of a sensor array of the camera while the optical filter is in the reflection state;

determining, for each of the plurality of sensors of the sensor array, a depth value indicative of a depth of the subject based on a measured aspect of the active IR light emitted from the IR illuminator and reflected from the subject back to each of the plurality of sensors;

switching the optical filter to a transmission state to allow transmission of spectral light in the spectral light sub-band, wherein the first plurality of liquid crystals is configured to dynamically form a nematic phase arrangement in the transmission state that transmits light in the spectral light sub-band, and the second plurality of liquid crystals is configured to dynamically form a nematic phase arrangement in the transmission state that transmits light in the spectral light sub-band;

deactivating the IR illuminator such that the IR illuminator does not emit active IR light while the optical filter is in the transmission state;

addressing the sensors of the sensor array while the optical filter is in the transmission state; and determining, for each of the plurality of sensors of the sensor array, one or more spectral light values based on one or more measurements of the sensor.

7. The method of claim 6, wherein the optical filter is configured to block substantially all visible light in all visible light sub-bands when the optical filter is in the reflection state.

8. The method of claim 6, where the optical filter includes a plurality of liquid crystal layers, where different liquid crystal layers of the plurality of liquid crystal layers are configured to block spectral light in different spectral light sub-bands and transmit spectral light outside of the spectral light sub-bands in the reflection state, and to transmit spectral light in the spectral light sub-band in the transmission state.

9. The method of claim 8, further comprising:
adjusting one or more of a center wavelength of a selected spectral light sub-band and a bandwidth of the selected spectral light sub-band by switching one or more liquid crystal layers from the transmission state to the reflection state.

10. The method of claim 6, where the plurality of sensors of the sensor array are differential sensors, and where the method further comprises activating the IR illuminator in synchrony with addressing the differential sensors of the sensor array to differentially measure the measured aspect of the active IR light emitted from the IR illuminator and reflected from the subject back to each of the plurality of sensors.

11. A camera comprising:
an infrared (IR) illuminator configured to emit active IR light in an IR light sub-band;
a sensor array including a plurality of sensors;
an optical filter for the sensor array switchable between a reflection state and a transmission state, the optical filter including:
a first layer of liquid crystals configured to
dynamically form cholesteric phase structures in the reflection state that block circularly polarized light of a first handedness in a spectral light sub-band and transmit light outside of the spectral light sub-band, and
dynamically form a nematic phase arrangement in the transmission state that transmits light in the spectral light sub-band;
a second layer of liquid crystals configured to
dynamically form cholesteric phase structures in the reflection state that block circularly polarized light in the first handedness the spectral light sub-band and transmit light outside of the spectral light sub-band, and
dynamically form the nematic phase arrangement in the transmission state that transmits light in the spectral light sub-band; and
a wave plate positioned in between the first layer of liquid crystals and the second layer of liquid crystals and configured to convert circularly polarized light of a second handedness to circularly polarized light of the first handedness, wherein the optical filter is configured to transmit IR light in an IR light sub-band in both the transmission state and the reflection state; and
a controller machine configured to:
switch the optical filter to the reflection state to block spectral light in the spectral light sub-band,
activate the IR illuminator to illuminate a subject with the active IR light while the optical filter is in the reflection state,
address the sensors of the sensor array while the optical filter is in the reflection state,
determine, for each of the plurality of sensors of the sensor array, a depth value indicative of a depth of the subject based on a measured aspect of the active IR light emitted from the IR illuminator and reflected from the subject back to each of the plurality of sensors,
switch the optical filter to the transmission state to allow transmission of spectral light in the spectral light sub-band,
deactivate the IR illuminator such that the IR illuminator does not emit active IR light while the optical filter is in the transmission state, and
address the sensors of the sensor array while the optical filter is in the transmission state.

12. The camera of claim 11, wherein the optical filter is configured to block substantially all visible light in all visible light sub-bands when the optical filter is in the reflection state.

13. The camera of claim 11, where the optical filter includes a plurality of liquid crystal layers, where different liquid crystal layers of the plurality of liquid crystal layers are configured to block spectral light in different spectral light sub-bands and transmit spectral light outside of the spectral light sub-bands in the reflection state, and to transmit spectral light in the spectral light sub-band in the transmission state.

14. The camera of claim 13, wherein the controller machine is configured to adjust one or more of a center wavelength of a selected spectral light sub-band and a bandwidth of the selected spectral light sub-band by switching one or more liquid crystal layers from the transmission state to the reflection state.

15. The camera of claim 11, where the plurality of sensors of the sensor array are differential sensors, and where the controller machine is configured to activate the IR illuminator in synchrony with addressing the differential sensors of the sensor array to differentially measure the measured aspect of the active IR light emitted from the IR illuminator and reflected from the subject back to each of the plurality of sensors.

* * * * *